(12) United States Patent
Braudaway et al.

(10) Patent No.: US 7,583,814 B2
(45) Date of Patent: *Sep. 1, 2009

(54) PROTECTING IMAGES WITH AN IMAGE WATERMARK

(75) Inventors: Gordon Wesley Braudaway, Yorktown Heights, NY (US); Frederick Cole Mintzer, Shrub Oak, NY (US)

(73) Assignee: International Business Machines Corporation, Armonk, NY (US)

( * ) Notice: Subject to any disclaimer, the term of this patent is extended or adjusted under 35 U.S.C. 154(b) by 265 days.

This patent is subject to a terminal disclaimer.

(21) Appl. No.: 11/522,788

(22) Filed: Sep. 18, 2006

(65) Prior Publication Data

US 2008/0212824 A1     Sep. 4, 2008

Related U.S. Application Data

(60) Continuation of application No. 09/931,210, filed on Aug. 16, 2001, now Pat. No. 7,130,442, which is a continuation-in-part of application No. 09/098,233, filed on Jun. 16, 1998, now Pat. No. 6,577,744, which is a division of application No. 08/738,930, filed on Oct. 28, 1996, now Pat. No. 5,825,892.

(51) Int. Cl.
    *H04K 1/00*     (2006.01)
(52) U.S. Cl. .................................. 382/100
(58) Field of Classification Search ................ 382/100, 382/232; 713/176; 380/51, 54, 55; 358/3.28
    See application file for complete search history.

(56) References Cited

U.S. PATENT DOCUMENTS 5,530,759 A * 6/1996 Braudaway et al. ........... 380/54
5,721,788 A * 2/1998 Powell et al. ............... 382/100
5,825,892 A * 10/1998 Braudaway et al. ........... 380/51
6,577,744 B1 * 6/2003 Braudaway et al. ......... 382/100

FOREIGN PATENT DOCUMENTS

EP     0 581 317 A2 *     2/1994

OTHER PUBLICATIONS

Szepanski, "A Signal Theoretic Method for Creating Forgery-Proof Documents for Automatic Verification," Proc. Carnahan Conf. on Crime Countermeasures, 1979, pp. 101-109.*

* cited by examiner

*Primary Examiner*—Andrew W Johns
(74) *Attorney, Agent, or Firm*—Law Offices Of Ira D. Blecker, P.C.

(57) ABSTRACT

A robust means of watermarking a digitized image with a highly random sequence of pixel brightness multipliers is presented. The random sequence is formed from 'robust-watermarking-parameters' selected and known only by the marker and/or the marking entity. A watermarking plane is generated which has an element array with one-to-one element correspondence to the pixels of the digitized image being marked. Each element of the watermarking plane is assigned a random value dependent upon a robust random sequence and a specified brightness modulation strength. The so generated watermarking plane is imparted onto the digitized image by multiplying the brightness value or values of each pixel by its corresponding element value in the watermarking plane. The resulting modified brightness values impart the random and relatively invisible watermark onto the digitized image. Brightness alteration is the essence of watermark imparting. Detection of an imparted watermark requires knowing the watermarking plane with which the watermark was imparted. Regeneration of the watermarking plane requires knowledge of the robust-marking-parameters used in its formulation. This is generally only known to the marker and/or marking entity. Once regenerated the watermarking plane is used together with a verifying image located in a 'visualizer' to demonstrate the existence of the watermark.

31 Claims, 19 Drawing Sheets

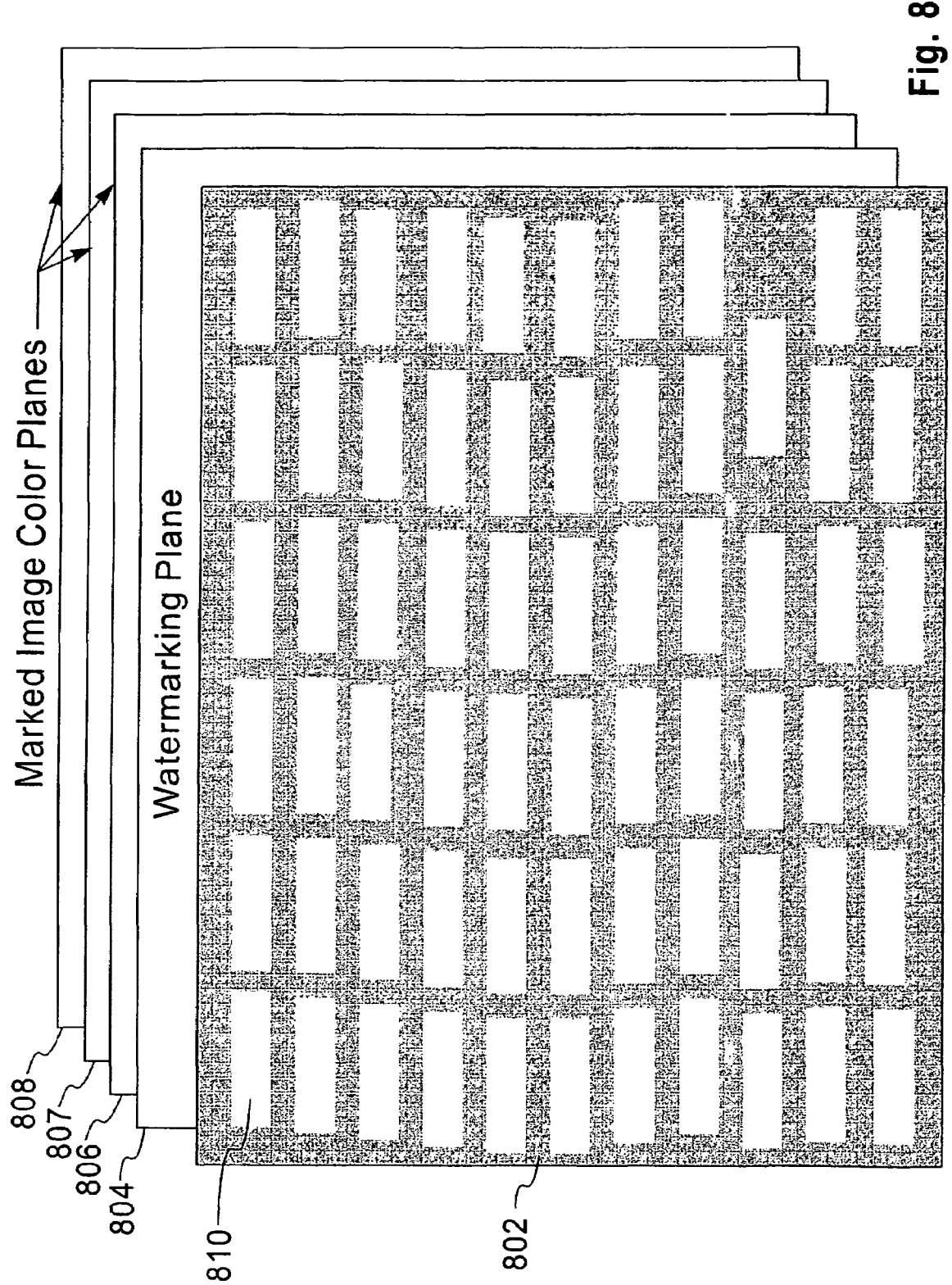

PROTECTING IMAGES WITH AN IMAGE WATERMARK

PRIORITY

This application is a continuation of application Ser. No. 09/931,210, file Aug. 16, 2001, now U.S. Pat. No. 7,130,442, which is a continuation-in-part of application Ser. No. 09/098,233, filed on Jun. 16, 1998, now U.S. Pat. No. 6,577,744, which is a division of application Ser. No. 08/738,930, filed Oct. 28, 1996, now U.S. Pat. No. 5,825,892.

FIELD OF THE INVENTION

This application relates to the field of digital imaging. It is more specifically concerned with the insertion and detection of an identifying mark on a work-piece.

BACKGROUND OF THE INVENTION

It is a constant endeavor to find improved techniques of placing a visible or invisible identifying mark on an image. This is generally useful to establish ownership, origin and authenticity, and also to discourage those who might wish to purloin or misappropriate the work. Identifying marks are also useful to give evidence of unauthorized alteration or disclosure.

Visible marks are herein classified as being either visible robust or visible fragile. A mark is classified as visible robust if it can be seen by the unaided eye and cannot be easily removed from the work-piece, if at all, without leaving telltale evidence. It is classified as visible fragile if the mark itself is visibly altered by an attempt to alter the work-piece or its wrapper.

Invisible marks are herein classified relative to the appearance of that mark to a human being with normal visual acuity. A mark on an image is classified as having an invisibility classification level of undetectably invisible if, when the image without the marking is displayed together with an image copy with the marking, the human being is equally likely to select either of these copies. An undetectably invisible mark is below or at the human being's just-noticeable difference. A mark on an image is classified as having an invisibility classification level of subliminally invisible if the mark is not distracting to the human being, although it is above the human being's just noticeable difference. An image marking is classified as being marginally invisible if it does not cause the marked image to lose its usefulness or value because of the mark. An image marking is classified as being poorly invisible if the marking causes a reduction in the image's usefulness and/or value.

Presently, both visible and invisible markings of hardcopy documents are used as a generally dependable method of establishing ownership and authenticity. These time-tested methods are also useful for marking a "softcopy" digitized image, also referred to herein as a digital image or image. A digital image is an abstraction of a physical image that has been scanned and stored in a computers memory as rectangular arrays of numbers corresponding to that image's (one or more) color planes. Each array element corresponding to a very small area of the physical image is called a picture element, or pixel. The numeric value associated with each pixel for a monochrome image represents the magnitude of its average brightness on its single color (black and white) plane. For a color image, each pixel has values associated and representing the magnitudes or average brightness of its tristimulus color components representing its three color planes. Other image representations have more than three color components for each pixel. A different value is associated with each different one of the image's color planes.

In what follows, whenever reference is made to color planes it is understood to include any number of color planes used by a particular image's digitizing technique to define the pixels color characteristics. This includes the case when there is only a single plane defining a monochromatic image.

A digitalized image is recognizable as an image to a viewer only when the individual pixels are displayed as dots of white or colored light on a display or as dots of black or colored inks or dyes on a hardcopy. Pixels are normally spaced so closely as to be unresolvable by a human visual system. This results in the fusion of neighboring pixels by the human visual system into a representation of the original physical image. Image fusion by the human visual system makes invisible marking, or relatively invisible marking, of images possible. This property is fully exploited by the methods described here to both impart upon a digitized image an invisible watermark to a desired invisibility classification, and to subsequently demonstrate its existence. The imparting and demonstrated detection of a robust invisible marking on digital images, herein called invisible watermarking, are a primary aspect of the present invention.

Properties of a Robust Invisible Watermark

A proper invisible watermarking technique that imparts an invisible watermark upon a proprietary digitized image should satisfy several properties. The imparted watermark should appear to be invisible to any person having normal or corrected visual accommodation to a desired invisibility classification levels Clearly, the degree of marking is a dichotomy. A balance has to be struck between protecting the image from unauthorized uses and not having the watermark unpleasantly alter the appearance of the image. This generally means that a recognizable pattern should not appear in the marked image when the watermark is applied to a uniform color plane. This requirement discourages marking the image by varying the hue of its pixels, since the human visual system is significantly more sensitive to alterations in hue than in brightness. The requirement can be satisfied by a technique based on varying pixel brightness implemented in a proper way. A technique based on varying pixel brightness also allows the same marking technique applied to color images to be equally applicable to monochrome images.

Another property of a proper invisible watermarking technique is that it should have a detection scheme such that the probability of a false-positive detection is vanishingly small. For purposes of the present invention, the probability of detection of a watermark in an image when one does not exist should be less than one in a million. There is generally little difficulty satisfying this requirement when the technique is statistically based.

Still another property of a proper watermarking technique is that it should be possible to vary the degree of marking applied to an image. In this way, the watermark can be made as detectable as necessary by the particular application. This property is important in highly textured images where it is often necessary to increase the intensity of the mark to increase its likelihood of detection. This is in contradistinction with images that have low contrast in which it is advantageous to reduce the marking intensity to lessen undesirable visible artifacts of the watermark itself.

It is also highly desirable that when detected the demonstrated existence of the watermark should be translatable to a recognizable visual image having relatively bold features with a high contrast ratio. Features of a demonstrated visual image that are not relatively bold may otherwise be difficult to show if the watermark has been attacked in attempts to defeat its protection.

Finally, the imparted watermark should be robust in that it should be very difficult to be removed or rendered undetectable. It should survive such image manipulations that in themselves do not damage the image beyond usability.

This includes, but is not limited to, JPEG "lossy" compression, image rotation, linear or nonlinear resizing, brightening, sharpening, "despeckling," pixel editing, and the superposition of a correlated or uncorrelated noise field upon the image. Attempts to defeat or remove the watermark should be generally mare laborious and costly than purchasing rights to use the image. If the image is of rare value, it is desirable that the watermark be so difficult to remove that telltale traces of it can almost always be recovered.

SUMMARY OF THE INVENTION

An aspect of the present invention is to provide a method for imparting a watermark onto a digitized image comprising the steps of providing the digitized image, and multiplying the brightness data associated with at least one of the image pixels by a predetermined brightness multiplying factor. The image includes a plurality of pixels, wherein each of the pixels includes brightness data that represents one brightness value if the image is monochrome, or a plurality of brightness data values if the image has multiple colors. In an embodiment the brightness multiplying factor ranges from 0.9 to 1.1. The brightness multiplying factor has a relationship with a number taken from a random number sequence and the relationship is a linear remapping to provide a desired modulation strength.

In an embodiment, each of the pixels has a row and a column location in an array representing the digitized image, and the brightness multiplying factor employs a different sequential combination of numbers from a robust random number sequence in sequential correspondence to the row and column location.

Another aspect of the present invention is to provide a method for generating a watermarked image wherein a watermark is imparted onto a digitized image having a plurality of original elements having original brightnesses. The method includes the step of providing a digitized watermarking plane comprising a plurality of watermarking elements, having a watermark brightness multiplying factor and having one-to-one correspondence with the original elements. It also includes the step of producing a watermarked image by multiplying the original brightness of each of the original elements by the brightness multiplying factor of a corresponding one of the watermark elements wherein the watermark is invisible. In an embodiment, the original image forms an original plane and the watermarking image forms a watermarking plane being smaller than the original plane, the method further includes the step of extending the watermarking plane by tiling such that the watermarking plane covers the original plane and/or further comprises the step of truncating the watermarking plane such that the watermarking plane covers the original plane, upon determining that the watermarking plane extends beyond the original plane.

Another aspect of the present invention is to provide a method for forming a watermarking plane including a plurality of elements each having a multiplying value. The method comprises the steps of: generating a secure random sequence of integers having a first plurality of bit; linearly remapping the random sequence to form a remapped sequence of brightness multiplying factors to provide a desired modulation strength; computing a discrete Fourier transform of the remapped sequence to form a Fourier sequence having frequency coordinates; expanding the frequency coordinates to form an expanded sequence; and computing an inverse Fourier transform of the expanded sequence to obtain a watermarking sequence of values.

An embodiment further includes one or more or the following: the step of expanding is accomplished by zero-padding; the method further comprises a step of employing the watermarking sequence to provide the multiplying value for each of the elements; the method further comprises the steps of hardclipping the watermarking sequence to form a hardclipped sequence having sequence members, and utilizing a different one of the sequence members to provide the multiplying value for each of the elements; the method further comprises the steps of adjusting the watermarking sequence to form a normalized sequence of values having a mean and a median equal to the difference between unity and the modulation strength, and having a maximum of unity, and employing the normalized sequence to provide the multiplying value for each of the elements; the method further comprises the steps of providing an unmarked original image having a plurality of original pixels, each of the pixels having at least one brightness magnitude, wherein a first number of the original pixels is greater than a second number of the plurality of elements, expanding the watermarking plane by tiling to cover the unmarked original image such that one of each of the pixels has one corresponding element from the elements; and multiplying the at least one brightness magnitude of each of the pixels by the multiplying value of the corresponding element.

Still another aspect of the present invention is to provide a method for detecting a watermark in a marked image. The marked image is marked by a watermarking plane which has a plurality of watermarking elements. Each of the image pixels has at least one brightness value and each of the watermarking elements has a brightness multiplying factor. The method employs a selector and a visualizer and at least one counter to store the comparison data resulting from comparisons for each of a plurality of selector elements and positions, of the statistical brightness of image pixels and watermarking plane elements with the statistical brightness of neighboring elements/pixels. The method further comprises the step of displaying a visualizer coincidence image such that a user can make a determination as to whether the pattern encoded by the visualizer pixels is recognizable and the watermark is detected.

RELIEF DESCRIPTION OF THE DRAWINGS

These and other objects, features, and advantages of the present invention will become apparent upon further consideration of the following detailed description of the invention when read in conjunction with the drawing figures, in which:

FIG. 8 shows a random positioning of the selector array over the watermarking plane and the image planes.

DETAILED DESCRIPTION OF THE INVENTION

Figure 1:
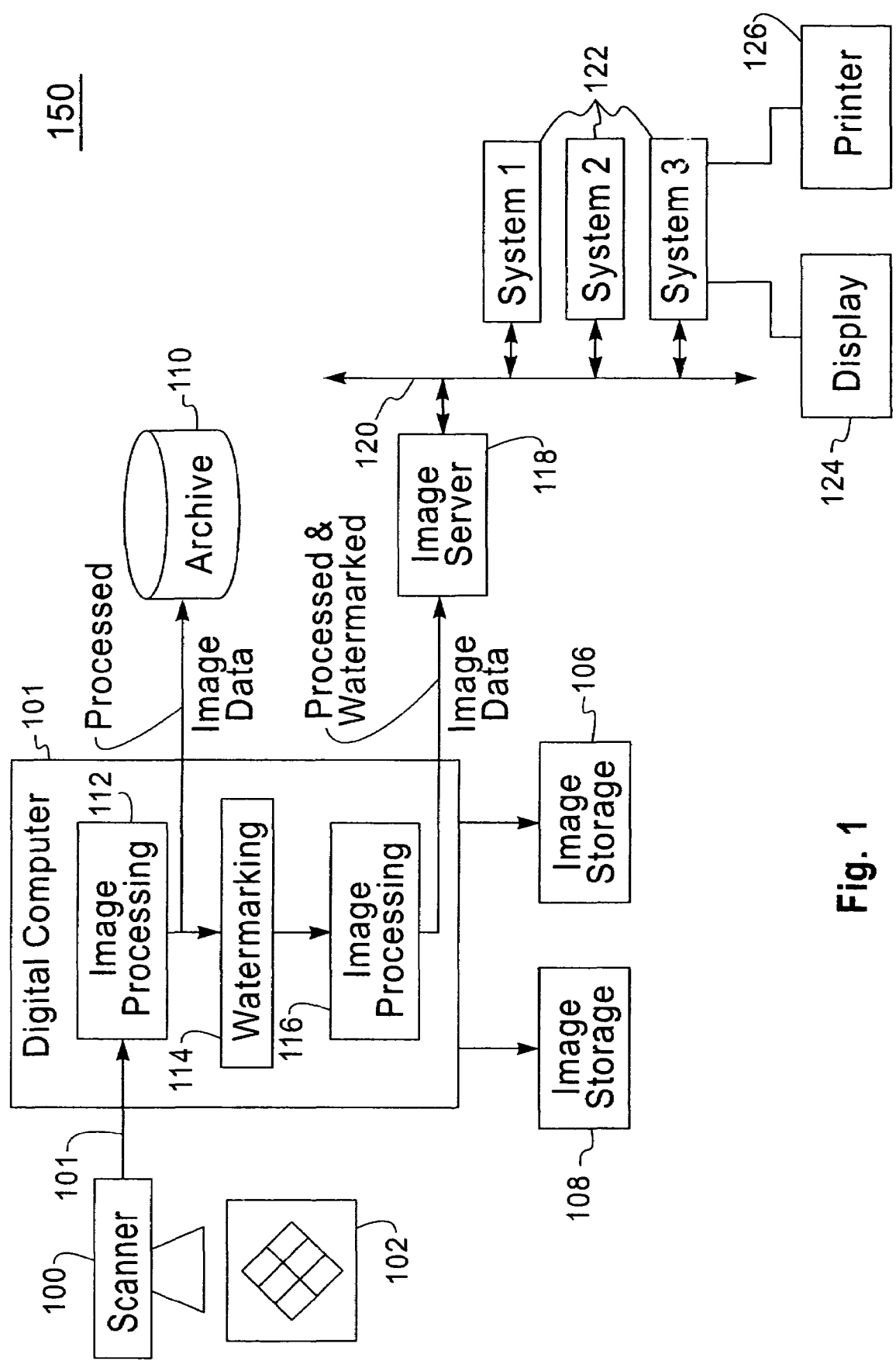
FIG. 1 shows a block diagram of an image capture and distribution system suitable for use in accordance with an embodiment of the present invention.

The present invention provides a robust means of watermarking a digitized image with a highly random sequence of pixel brightness multipliers. The random sequence is formed from four 'robust-watermarking-parameters' selected and known only by the marker and/or the marking entity. A watermarking plane is generated which has an element array with one-to-one element correspondence to the element array or arrays of the digitized image being marked. Each element of the watermarking plane is assigned a random value dependent upon a robust random sequence and a specified brightness modulation strength. The so generated watermarking plane is imparted onto the digitized image by multiplying the brightness value or values of each pixel by its corresponding element value in the watermarking plane. The resulting modified brightness values impart the random and relatively invisible watermark onto the digitized image. Detection of an imparted watermark requires knowing the watermarking plane with which the watermark was imparted. Regeneration of the watermarking plane requires knowledge of the robust-marking-parameters used in its formulation. This is generally only known to the marker and/or marking entity. Once regenerated the watermarking plane is used together with a verifying image located in a 'visualizer' to demonstrate the existence of the watermark.

Brightness alteration is the essence of watermark imparting according to the present invention. Pixel brightness, as used herein, expresses the brightness of a visual stimulus in terms of the CIE 1931 Standard Colorimetric Observer and Coordinate System tristimulus component brightness X, Y and Z that correspond to a matching mixture of three reference Stimuli. A more detailed description of pixel brightness is found in G. Wyszecki and W. S. Styles, "Color Science: Concepts and Methods, Quantitative Data and Formulae," John Wiley & Sons, Inc. (2nd ed.), New York, 1982, pp. 164-169, incorporated herein by reference in its entirety. The CIE 1931 standard specifies three particular reference stimuli. The stimuli are radiometric quantities, and as such are expressed in radiometric units such as watts. Grassmann's law, on which nearly all of modern colorimetry is based, requires use of the three specific reference stimuli, or three others that are distinct linear combinations of them. This is discussed in D. B. Judd and G. Wyszecki, "Color in Business, Science, and Industry," (3rd ed.), John Wiley & Sons, Inc., New York, 1975, pp. 45-47, incorporated herein by reference in its entirety. By modifying only a pixel's brightness, its color, represented by its hue and saturation, is not changed. This is accomplished by preserving the ratios of X:Y and Z:Y while changing the magnitude of Y. A pixel represented in any nonlinear color space, such as the color space of the subtractive dyes Cyan, Magenta, Yellow and Black (CMYK) used in color printing, will be translated to the X,Y,Z color space (or to a color space linearly related to it) before the pixels brightness is modified.

FIG. 1 shows a block diagram of a system embodiment for imparting a relatively invisible watermark on a digitized image in accordance with the present invention. FIG. 1 shows an image capture and distribution system 150 suitable for use in accordance with an embodiment of the present invention. A scanner 100 captures image data 101 from a physical source 102. The physical source 102 is typically a painting or photograph. The image sends data 101 to a digital computer 104. The computer 104 includes a working storage 106 that is typically embodied in the computer's random access memory, an image storage system 108 that is often a conventional hard disk drive, and an image archive 110 that can be a tape or disk storage. The computer 104 also includes a number of software modules. These include front end image processing software 112 that performs image processing such as scaling and enhancement of the image data provided by the scanner 100. It also includes color preserving watermarking software 114 operating in accordance with the principles of the present invention, and back-end image processing software 116 that performs other processing functions such as compression on the watermarked image. Most often, the unprocessed or front-end digitized original image 101 is sent to the image archive 110 for preservation in unwatermarked form.

An alternate embodiment has the original image already available in digitized form 101 without requiring a scanner 100. The watermarking software 114 applies a relatively invisible watermark to the digitized image 101 in accordance with the principles of the present invention. The watermarking process can also be performed on a copy of an archived image or on other scanned and processed image data, which has been loaded in whole or in part, into the computer's working storage 106.

The processed, watermarked and compressed image produced by the combination of the software modules 112-116 is sent from the working storage 106 or image storage 108 to an image server 118 that is connected to a digital network 120. When appropriate, the digital network is interconnected with a Local Area Network (LAM), a Wide Area Network (WAN) such as the Internet, or both. Other systems 122 connected to the digital network 120 can request and receive images stored on the image server 118 via the digital network 120. In some cases, the systems can then display the received images on a display device 124 and/or print the images on a graphics capable printer 126. Those skilled in the art will recognize that there are many other system configurations in which the present invention could be employed. The system of FIG. 1 is generally also useful for detecting and demonstrating the existence of the watermark in a manner such as those described subsequently.

Marking an Image with a Robust Watermark

In one embodiment, the watermark imparted onto the digitized image is a monochrome pattern, herein called "the watermarking plane," that overlays the digitized image. The pattern is embodied by selecting its element values from a robust random sequence formed from a group of robust sequence generating parameters. The parameters are used to generate a generally strongly encrypted random sequence in a manner well known to those skilled in the art. These parameters are herein referred to as the 'robust-watermarking-parameters'. In a preferred embodiment, these parameters include a cryptographic key, two coefficients of a linear random number generator, and an initial value of the random number generator.

Each value, or group of values, of the robust random sequence is associated with one of the pixels of the digitized image. Most often the values of the random sequence are linearly remapped to meet particular criteria. All the brightness values of the plurality of color planes of each pixel are multiplied by its associated linearly remapped robust random sequence value called its brightness multiplying factor or multiplying factor. A brightness Multiplying factor which modifies element brightness values by less than ten percent is herein referred to as a brightness multiplying factor producing a relatively invisible watermark. It is noted that depending on the texture of the image being watermarked, the brightness values are generally modified on average by a percentage factor of only 0.3 to 4 percent, and rarely up to 6 percent. This is in order to make the marking less visible. The percentage factor is herein referred to as the modulation strength. The actual modulation strength employed is dependent upon the classification level of invisibility required by the particular use. It is not advisable to employ a brightness multiplying factor greater than unity. This can result in some pixel brightness values being greater than one. If employed, it is recommended that all brightness values greater than one be clipped to a value of unity. This can alter the pixels color, thus altering the appearance of the image.

Imparting a watermark upon a digitized image by varying the brightness of each pixel with a multiplying factor maintains each pixel's color by satisfying Grassmann's law. A compromise is generally made in selecting modulation strength. A smaller percentage makes the watermark less visible but more difficult to detect. A larger percentage makes it easier to detect and demonstrate the existence of the watermark, but makes the watermark more visible. A highly textured image may require the use of a relatively high modulation strength. An imparted watermark is considered to be undetectably invisible in all cases if the modulation strength is less than 0.5%, oven when the unmarked digitized image is a uniform medium gray. For digitized images having more practical and valuable features, subliminally invisible watermarks generally have modulation strengths of 1% to 3%, depending on the degree of textural variation in the image itself.

The watermark imparted in accordance with this invention is selected so as to appear to be relatively invisible to any person having normal or corrected visual accommodation. The probability of a false-positive detection of the watermark in an image when it does not exist is less than one in a million. It is possible to vary the degree of imparted watermarking onto the image so that the watermark can be made as detectable as necessary consistent with a required invisibility classification. The detected watermark is translatable to a recognizable visual image having relatively bold features and with a very high contrast ratio. The watermark once imparted, is very difficult to remove or to be rendered undetectable without reducing the usefulness and/or value of the digitized image.

In an embodiment of this invention, marking a digitized image with an invisible watermark requires the formation of a plane for watermarking. The invisible watermark is herein represented as a rectangular array of numeric elements, henceforth referred to as the watermarking plane, having I rows and J columns. The I rows and J columns correspond to the dimensions of the entire original digitized image, or a portion thereof, to which it is being applied.

When an original digitized image is very large, a generated watermarking plane not large enough to cover the entire original image is extended by tiling replication in any direction necessary to cover the entire image. If a watermarking plane being so tiled extends beyond any edge of the original image, the plane is assumed to be truncated. These conventions are adopted for this embodiment to allow every pixel of the original image to have its brightness altered and to ensure that the marked image is equal in size to the original image. This forms a one-to-one correspondence between element locations in the watermarking plane and pixels in the color planes of the original image. This is generally a desirable implementation, even though alternate embodiments do not require watermarking the entire image.

In a preferred element, the value of each element in the array defining the watermarking plane is linearly remapped to be a random number in the range, $$1 \geq w(i,j) \geq (1-2\beta), \quad (1)$$

where, $$1 \leq i \leq I, \text{ and} \quad (2)$$

$$1 \leq j \leq J, \quad (3)$$

are the row and column indices of the array, and $\beta$ is the modulation strength of the watermark such that, $$0.1 \geq \beta \geq 0. \quad (4)$$

Additionally, all elements in the generated watermarking plane, treated as an ensemble, are adjusted to have a mean and median of $1-\beta$.

Imparting the watermark onto an image begins with generation of this watermarking plane. The watermark is imparted onto the original image by multiplying all the imparted brightness values associated with the color planes of each original image pixel by the value in its corresponding element in the watermarking plane.

Constructing the Watermakeing Plane

The construction of the watermarking plane is fundamental to insuring the robustness of the imparted watermark and its ability to survive even determined attacks. To this end, the procedure by which the values of the watermarking plane elements are chosen is based on cryptographic and two-dimensional signal processing theory techniques. These are used to satisfy particular requisite properties of the watermarking plane.

The Property of Unpredictable Randomness

Consideration is now given to the values of the watermarking plane elements to meet the property of unpredictable randomness. Unpredictable randomness requires that each element's value should vary randomly from the values of its neighbors, and the sequence of element values should be essentially unpredictable. Random variation of the elements is required for the watermark to be rendered relatively invisible. In as much as pattern recognition is one of the most dominant characteristics of the human visual system, the presence of any pattern among elements of the watermarking plane could make it visible. The unpredictability of the sequence of values is required to make the watermark robust and less vulnerable to attack. It is recognized that if all values in the watermarking plane could be predicted, the watermarking process could easily be reversed and the mark removed. This could thereby be used to essentially restore the marked image to a nearly perfect copy of the original unmarked image. Thus, a means of generating a highly unpredictable random number sequence is preferred.

Generating random values by a congruence method, typical of nearly all popular pseudorandom number generating algorithms, is not considered herein to provide an adequate level of unpredictability. These sequences have only modest cryptographic strength and are relatively easily discernible by crypto-analytic techniques. This is described in "The Cryptographic Security of Truncated Linearly Related variables," J. Hastad and A. Shanir, Proceedings of the 17th Annual ACM Symposium on the Theory of Computing, 1985, pp 356-362, which is herein incorporated by reference.

For the purposes of this invention a sequence is generated by using a strong cryptographic method such as the National Standard Data Encryption Algorithm. This is described in: "American National Standard Data Encryption Algorithm," ANSI x3.92-1981, American National Standards Institute, New York: and in A. G. Konheim, et al., "The IPS Cryptographic Programs," IBM System Journal, Vol. 19, No. 2, 1980, pp 253-283; which are herein incorporated by reference.

The data sequence of eight-bit values to be encrypted is selected by the marker, and is desirably generated by a congruence algorithm. However, the robust secure sequence is produced by action of the strong encryption algorithm on that data. Using this approach, a highly unpredictable watermarking plane can be produced. Moreover, it can be reproduced exactly by knowing only its four 'robust-watermarking-parameters'. These parameters are the initial state and the two coefficients of the congruence algorithm, and the cryptographic key used by the encryption algorithm. These algorithms generally produce sequences of values having eight-bits. Sixteen-bit values, referred to as $\alpha(i,j)$, are generated by concatenating two of the sequential eight-bit values produced by the encryption algorithm. Each sixteen-bit value so produced is linearly remapped to become an element of the array defining the watermarking plane as follows;

$$w(i, j) = 1 - 2\beta \left[1 - \frac{\alpha(i, j)}{65535}\right]$$

Additionally, all elements in the w(i,j) array, treated as an ensemble, are adjusted to have both a mean and median of 1-$\beta$. Ease of reproduction of the resulting encrypted sequence is important for watermark detection and demonstration techniques discussed subsequently. Other remapping or normalization techniques producing particular desired results are known to those familiar with the art.

The Property of Explicit Low Frequency Content

Another important consideration is for an embodiment that exploits the property of explicit low frequency content. Significant high frequency content results when the watermarking plane is composed by placing a unique random value in every element. Although high frequency content is beneficial in making the watermark less visible, it also makes it vulnerable to attack for watermark damage or extinction. This is evident from the following consideration. The highest pattern frequency achievable in a digital image is obtained by replicating a pair of adjacent pixels that have opposite extreme values. When the image is reduced in size, if image reduction filtering is used, the values of adjacent pixels are combined in a weighted average to form pixel values of the reduced image. If image decimation is used, pixels are selectively discarded. In either event, the high frequency content in the original image is lost in the reduced image. Any significant high frequency content in the applied watermarking plane becomes obliterated in the reduced image. Subsequent detection of the watermark imparted prior to the size reduction is very difficult if not impossible. The purposeful addition of low frequency content makes the watermark less vulnerable to this type of attack. However, the deliberate inclusion of significant low frequency content in the watermarking plane is another dichotomy. Its inclusion indeed makes the watermark less vulnerable to normal image manipulation and therefore more easily detectable. However, it generally makes the watermark more visible by producing a pattern with larger features in the watermarking plane. It is generally preferable to add only a controlled amount of low frequency content.

The deliberate addition of low frequency content to the original watermarking plane is accomplished in one embodiment by employing the discrete two-dimensional Fourier transform. First, a reduced-size watermarking plane is formed whose elements are uniformly distributed random values in accordance with the secure sequence described above. For discussion purposes, a square plane w($\mu$,v) having 0≦$\mu$≦$\Lambda$−1 rows and 0≦v≦$\Lambda$−1 columns is used. The discrete Fourier transform of the square plane is computed. Since all values of w($\mu$,v) are real numbers, advantage can be taken from its complex-conjugate symmetry. The complete Fourier transform can be specified as the array of complex numbers W($\sigma$,$\tau$) having dimensions 0≦$\sigma$≦$\Lambda$−1 and 0≦$\tau$≦$\Lambda$/2, and is symbolized as:

$$W(\sigma,\tau)=F[w(\mu,v)] \quad (5)$$

The frequency domain array W($\sigma$,$\tau$) is remapped into an expanded array W(s,t), where:

$$0 \leq s \leq L-1, 0 \leq t \leq L/2, \text{ and } L=2\rho\Lambda, \quad (6)$$

thus enlarging the ($\sigma$,$\tau$) by the factor $2^\rho$ in each dimension forming the (s,t)-space. If W($\sigma$,$\tau$) is defined such that W(0,0) is the coefficient of the constant or "zero-frequency" term, then:

$$W(L-s,t)=W(\Lambda-\sigma,\tau), \quad (7)$$

and $$W(s,t)=W(\sigma,\tau), \quad (8)$$

for $$0 \leq s = \sigma < \Lambda/2 \text{ and } 0 \leq t = \tau \leq \Lambda/2, \quad (9)$$

and $$W(s,t)=0, \quad (10)$$

for all other values of s and t. This technique is herein referred to as "zero-padding."

The inverse Fourier transformer of W(s,t) provides the modified watermarking plane w(m,n) having 0≦m≦L−1 rows and 0≦n≦L−1 columns. If, for example, $\rho$=2 and $\Lambda$=512, then w(m,n) is a square array having 2048 rows and columns. More importantly, however, w(m,n) has an assured low frequency content with a minimum period ($2^\rho=2^2=4$) four times longer than the minimum period possible in a $2048^2$ image plane. Since its generating kernel, w($\mu$,v), contains 262, 144 random values taken from a secure sequence, its vulnerability to attack by brute force replication is relatively small. In a case where a thusly marked image appears to be vulnerable, its kernel can easily be made larger.

Still tower frequency content can be impressed by using a $\rho$=3 making the highest frequency to be one eighth of the original highest frequency. The preferred embodiment uses $\rho=2$ so as not to over employ low frequency content that may cause the watermark to become undesirably visible.

The values of some elements of the generated watermarking plane so far produced may exceed one. Since each value is to be used as a multiplier of pixel brightness, it is therefore possible to produce a multiplied pixel brightness that is greater than one, which is a brightness that can not physically be displayed. In this event, any multiplied pixel brightness greater than one would have to be clipped to the maximum that can be displayed. The preferred embodiment, however, employs an additional process step to avoid the possible need for clipping. Before the generated modified watermarking plane is used, its elements, forming an ensemble, are adjusted to make both their mean and median values equal to $1-\beta$ and the maximum value equal to 1. With these adjustments, the requirement that, $$1 \geq w(i,j) \geq (1-2\beta), \quad (11)$$

for all i and j is satisfied. At this point, it is sometimes advantageous to "hard clip" the elements. In this situation, elements with values greater than or equal to $1-\beta$ are set to 1, and elements with values less than $1-\beta$ are set to $1-\beta$. Hard clipping normally increases the probability of detecting a watermark, but unfortunately, it also tends to make watermarking artifacts more visible in the marked image.

The Property of Plane Expansion by Tiling

The fact that the watermarking plane w(m,n) is produced as the result of an inverse discrete Fourier transform is very useful. If the watermarking plane is not large enough to cover the entire unmarked image, if L<I or L<J, it can be enlarged seamlessly by tiling replication downward or to the right to make a plane as large as desired, with each tiled extension adding an additional 4,194,304 elements. For the example dimensions used here, tiling replication is:

$$w(m',n')=w(m,n) \quad (12)$$

where, $$m'=(2048p)+m, \quad (13)$$

$$n'=(2048q)+n, \quad (14)$$

and p and q are nonnegative integers.

Figure 2:
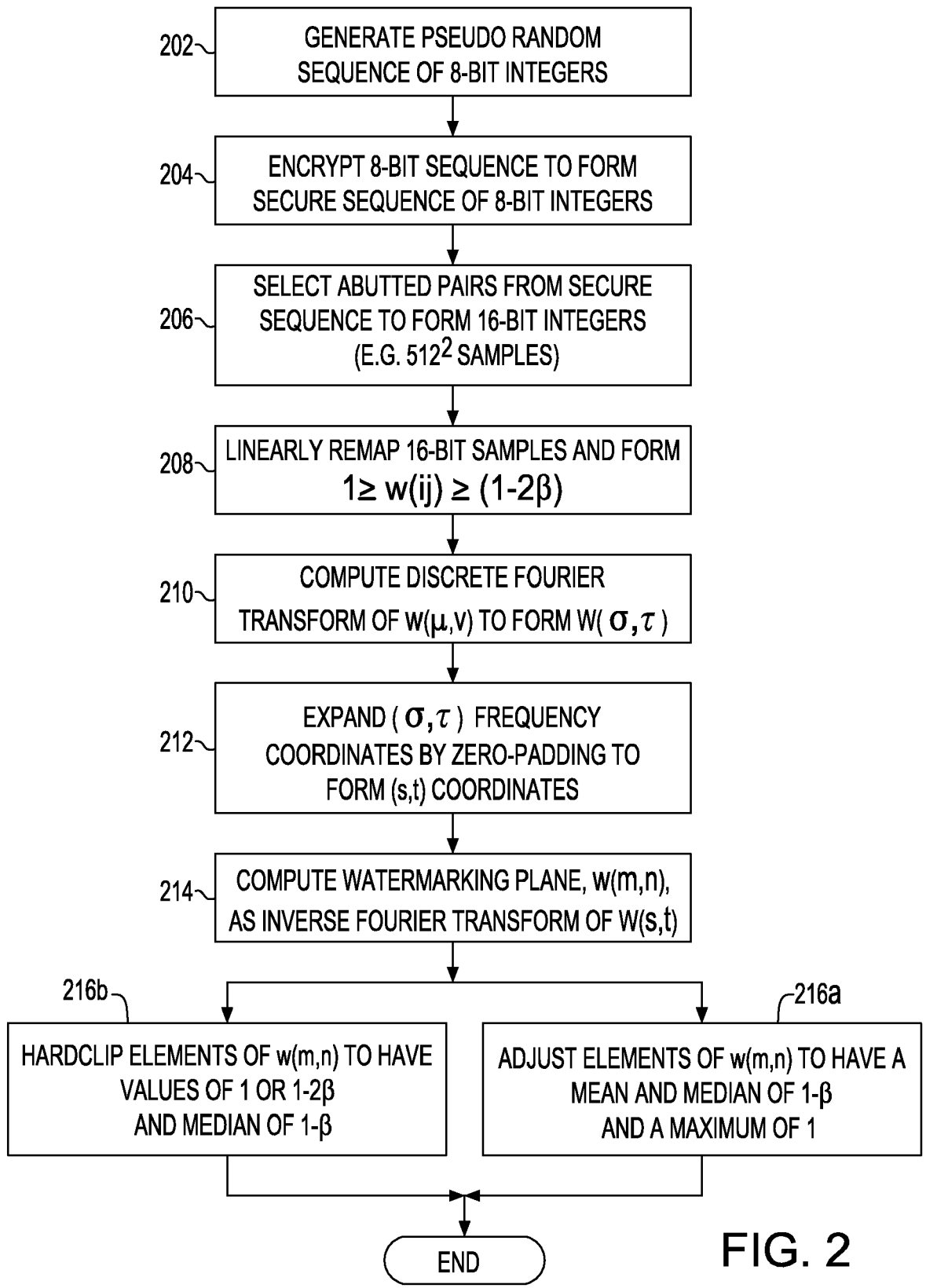
FIG. 2 shows an embodiment for forming a watermarking plane in accordance with the present invention.

In one embodiment, a watermarking plane is formed following the steps 202-216 shown in FIG. 2. These steps are herein referred to as the 'ideal interpolator watermarking plane generating method'. Firstly, an eight-bit pseudorandom sequence is generated, 202. The resulting sequence is encrypted to form a secure sequence of eight-bits values, 204. Sixteen bit integer samples are formed by concatenating two abutted values from the secure sequence, 206. The sixteen bit integer samples are linearly remapped and formed into a $w(\mu,v)$ array such that, $$1 \geq w(\mu,v) \geq (1-2\beta), \quad (15)$$

208. The Fourier transform frequency domain array $W(\sigma,\tau)$ is computed from $w(\mu,v)$, 210. The $W(\sigma,\tau)$ coordinates are expanded by zero-padding to form expanded frequency domain array W(s,t), 212. The preliminary watermarking plane array w(m,n) is computed by taking the inverse discrete Fourier transform of W(s,t), 214. The elements of the preliminary array w(m,n) are adjusted to collectively have a mean and median of (1β) and a maximum of 1, 216a. Alternatively, the elements w(m,n) are hard clipped to have only values of 1 or $1-2\beta$, with a median of $1-\beta$, 216b. The resulting adjusted array w(m,n) is the watermarking plane with elements that are brightness multiplying factors to be used for adjusting corresponding pixels of the image being watermarked.

The method presented here, employing forward and inverse discrete Fourier transforms to generate the watermarking plane, is an "ideal interpolator" with assured low frequency content. Other methods known to those skilled in-the-art are available. These include methods that use two-dimensional interpolation filters that can similarly be employed to produce acceptable results.

Figure 3:
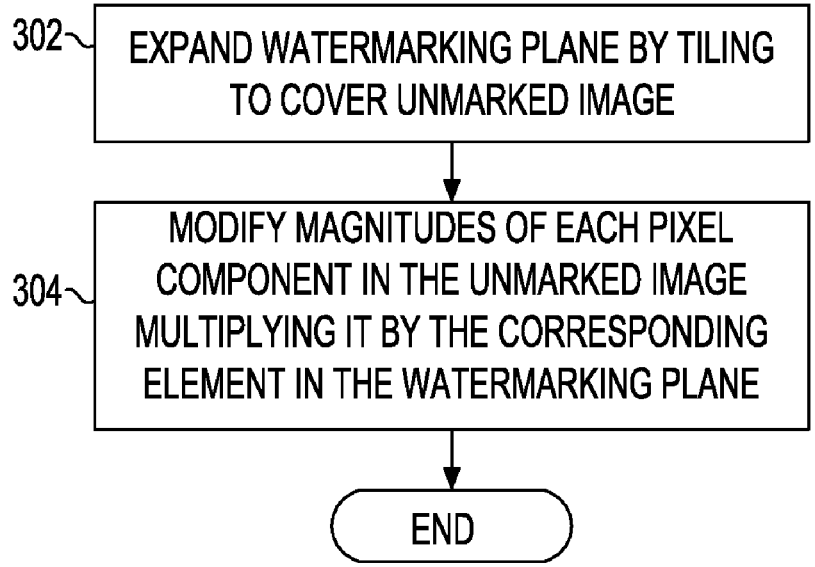
FIG. 3 shows an embodiment for the steps of watermark imparting.

The generated watermarking plane is then imparted onto the original unmarked digitized image. FIG. 3 shows an embodiment for the steps of watermark imparting. First, the watermarking plane is expanded by tiling to completely cover the image being watermarked, 302. This forms a one-to-one correspondence of an element in the expanded watermarking plane and a pixel in the original image. The brightness values of each pixel in the original image are multiplied by the value in its corresponding element in the expanded watermarking plane, 304. The resulting image with the new brightness values forms the watermarked image. The relative visibility of the watermark in the image is observed in relationship to the desired visibility classification level marking. If the marking is more visible than specified the steps of FIGS. 2 and 3 are repeated for a lower modulation strength. A watermark created with a lower modulation strength is generally less easily detected and demonstrated to exist. One the other hand, if the resulting watermark is less visible than specified, the steps of FIGS. 2 and 3 may be repeated to provide a watermark with a higher modulation strength. A watermark created at a higher modulation strength is generally easier to detect and have its existence demonstrated. Once imparted, an invisible watermark only serves its purpose if it can be detected and shown to exist.

Finding an Invisible Watermark Hidden in a Marked Image

It is most desirable to demonstrate the existence of the watermark with a visible image having bold features. This is herein employed using an image array called a "visualzer." Demonstration of the existence of the watermark imparted in accordance with the present invention requires a regeneration of the watermarking plane with which it was marked. This can generally only be performed by the marker and/or marking entity who alone knows the four parameters making up this application's 'robust-watermarking-parameters'. Knowledge of these parameters is required for generating the robust random sequence used in forming the watermarking plane. From these four parameters the robust random sequence is reformed. Values of the sequence are used to define the values of the elements. If a linear remapping process was employed in the generation of the watermarking plane, the element values are linearly remapped using that same process to redefine the expanded watermarking plane. The thusly reformed expanded watermarking plane is used in conjunction with the visualizer to demonstrate the existence of the expanded watermarking plane in the image. This is accomplished as described subsequent to an overview of watermark detection considerations.

Finding an invisible watermark hidden in a marked digitized image is a relatively difficult problem, and it is made more so by manipulations of the marked image that may have occurred. The watermark survives and is detectable for image manipulations that in themselves do not damage the image beyond usability. The detection method of the present invention can find an imparted watermark with a high degree of certainty in nearly all such cases. A significant advantage of the present method is that watermark detection does not require access to a copy of the entire original image. In most cases, all that is required is the watermarking plane used for imparting the watermark on the image. A perfect copy of the watermarking plane is reconstituted from its four defining parameters. If a copy or if even only a fragment of the original image is available, detection can have a somewhat higher probability of success.

Reorienting and Resizing the Watermarking Plane

A first consideration in finding a watermark is to determine how and by how much the marked image may have been manipulated. It may have been reduced in size. A Size reduction may even have been performed nonlinearly, such that its horizontal and vertical dimensions may have been reduced by unequal factors. The image may also have been rotated, not by an obvious ninety degrees, but by a small angle. Facilitating this determination is the knowledge that pixel values in the unmanipulated marked image are directly related to corresponding elements in the watermarking plane. If a significant fragment of the original image is available, a fragment of the unmanipulated marked image can be reconstructed. Either the reconstituted watermarking plane or a reconstructed fragment of the marked image is a suitable "correlation reference plane."

Figure 4:
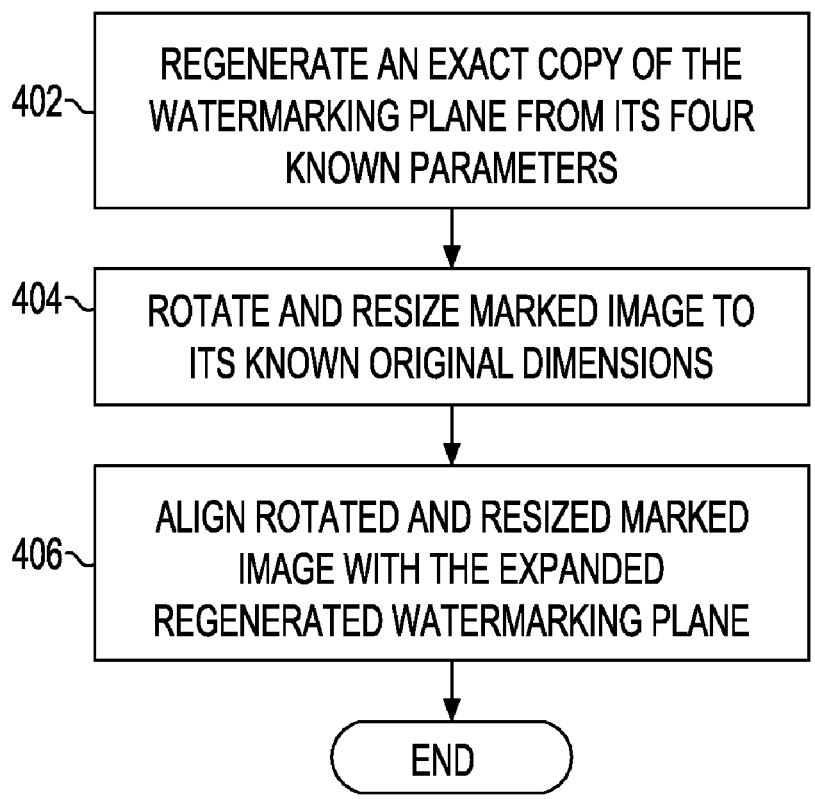
FIG. 4 shows an overview of the steps for image alignment.

An overview of the steps of reconstructing a manipulated watermarked image is shown in FIG. 4. First, the watermarking plane used for imparting the watermark onto the image is regenerated from the four 'robust-watermarking-parameters' generally only known to the marker and/or the marking entity, 402. Secondly, the marked image is resized and rotated to its known original dimensions, 404, Thirdly, the resized and rotated image is aligned with the expanded regenerated watermarking plane such as to provide one-to-one correspondence of the elements of each with the elements of the other, 406.

In an actual implementation the steps of reorienting and resizing the marked image may be broken into a coarse placement followed by a fine alignment. The coarse placement is performed by visual inspection of a displayed copy of a portion or the complete marked image overlaying a corresponding portion or complete correlation reference plane. The correlation reference plane is reoriented and resized to the size and orientation of the marked image by axis reduction or expansion, translation and/or rotation. This is accomplished using techniques well known to those skilled in the art. The coarse placement generally brings the correlation reference plane to within 4 percent of the manipulated marked image's size and within four degrees of its orientation.

Figure 5:
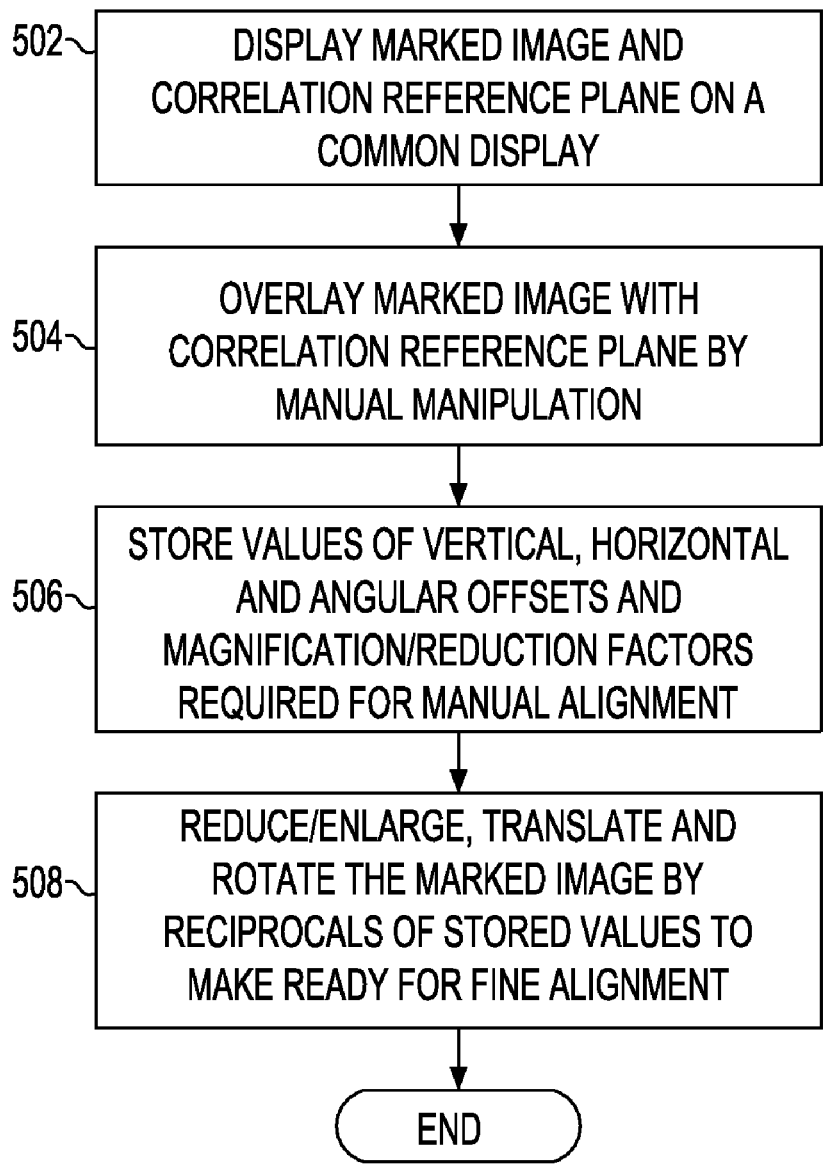
FIG. 5 shows the steps for a coarse alignment of a marked image with a correlation reference plane.

FIG. 5 shows the steps for an embodiment for performing coarse placement. Both the marked image and the correlation reference plane are displayed on a common display, 502. The vertical axis and horizontal axis magnification, offset and angular rotation of the correlation reference plane display are varied to make the displayed correlation reference plane closely overlay the corresponding portions of the displayed manipulated marked image, 504. The values of the magnification/reduction factors, horizontal and vertical offsets and angle of rotation are noted and stored, 506. The entire marked image is rescaled, translated and rotated by the reciprocals of the noted values so that it visually matches the correlation reference plane, 508. The so coarsely manipulated reconstituted marked image is further manipulated to perform the fine alignment.

According to the Fourier Shift Theorem, Rotation Theorem and Scaling Theorem, the properties of translation, rotation and scaling transcend the Fourier transformation of an image, and, if present in w(m,n), each will also be present (or, in the case of scaling, its reciprocal will be present) in W(s, t). This is useful to determine a more precise angle of rotation, horizontal and vertical scale factors, and translation offsets of the correlation reference plane relative to the marked image. This is accomplished by first constructing a three-dimensional "array of phase-correlation maxima." The three axes of the array correspond to the horizontal scale factor, the vertical scale factor, and the angle of rotation of the correlation reference plane relative to the marked image. Phase-correlation is defined as follows. Let w(s,t) be the discrete Fourier transform of the correlation reference plane, U(s,t) be the Fourier transform of the marked image u(m,n), and U*(s,t) be the complex conjugate of U(s,t). The phase-correlation plane p(m,n) is computed using the relationship;

$$p(m, n) = F^{-1}\left[\frac{W(s, t)U*(s, t)}{|W(s, t)U*(s, t)|}\right]. \quad (16)$$

The value at each array point is the maximum magnitude of the corresponding phase-correlation plane. It is computed using an incrementally rescaled and rotated correlation reference plane. Any one of the color planes of the marked image usually suffices as the required array u(m,n). Interpolating among the values of the three-dimensional array yields coordinates of the greatest-of-the-greatest phase-correlation maxima. From these coordinates, values of the horizontal and vertical scale factors and angle of rotation of the correlation reference plane relative to the marked image are directly read. The correlation reference plane is then rescaled and rotated to more precisely align it with the manipulated marked image. A final phase-correlation evaluation is made to determine the relative horizontal and vertical offsets of the modified correlation reference plane relative to the manipulated marked image. Finally, the entire marked image is rescaled, translated and rotated in accordance with the measured valves to restore it to its original size and orientation. The thusly modified marked image is now ready for use in the detection and demonstration process to show the existence of the watermark in the manipulated marked image.

In one embodiment the fine align t of the correlation reference plane relative to the marked image is performed by evaluating a three-dimensional array of phase-correlation maxima, and then interpolating within that array to find the location of the maximum of those maxima. The axes of the array are the horizontal magnification, vertical magnification and angular rotation that are systematically applied to the correlation reference plane. All combinations of the following incremental steps define the values of the coordinates of the array. The vertical axis of w(m,n) is magnified/reduced from 96% to 104% of its original size in 2% increments. In similar fashion the horizontal axis of w(m,n) is magnified/reduced from 96% to 104% of its original size in 2% increments. Also in similar fashion w(m,n) is rotated relative to its original orientation from −5 degrees to +5 degrees in 2 degree steps.

At each combination of vertical magnification, horizontal magnification, and angular rotation of the correlation reference plane, the phase-correlation plane p(m,n) is recomputed as above. The maximum of the point values p(m*,n*) in the plane is stored into the three-dimensional array of phase-correlation maxima at coordinates corresponding to each of the incrementally adjusted values of vertical magnification, horizontal magnification, and angular rotation.

Figure 6:
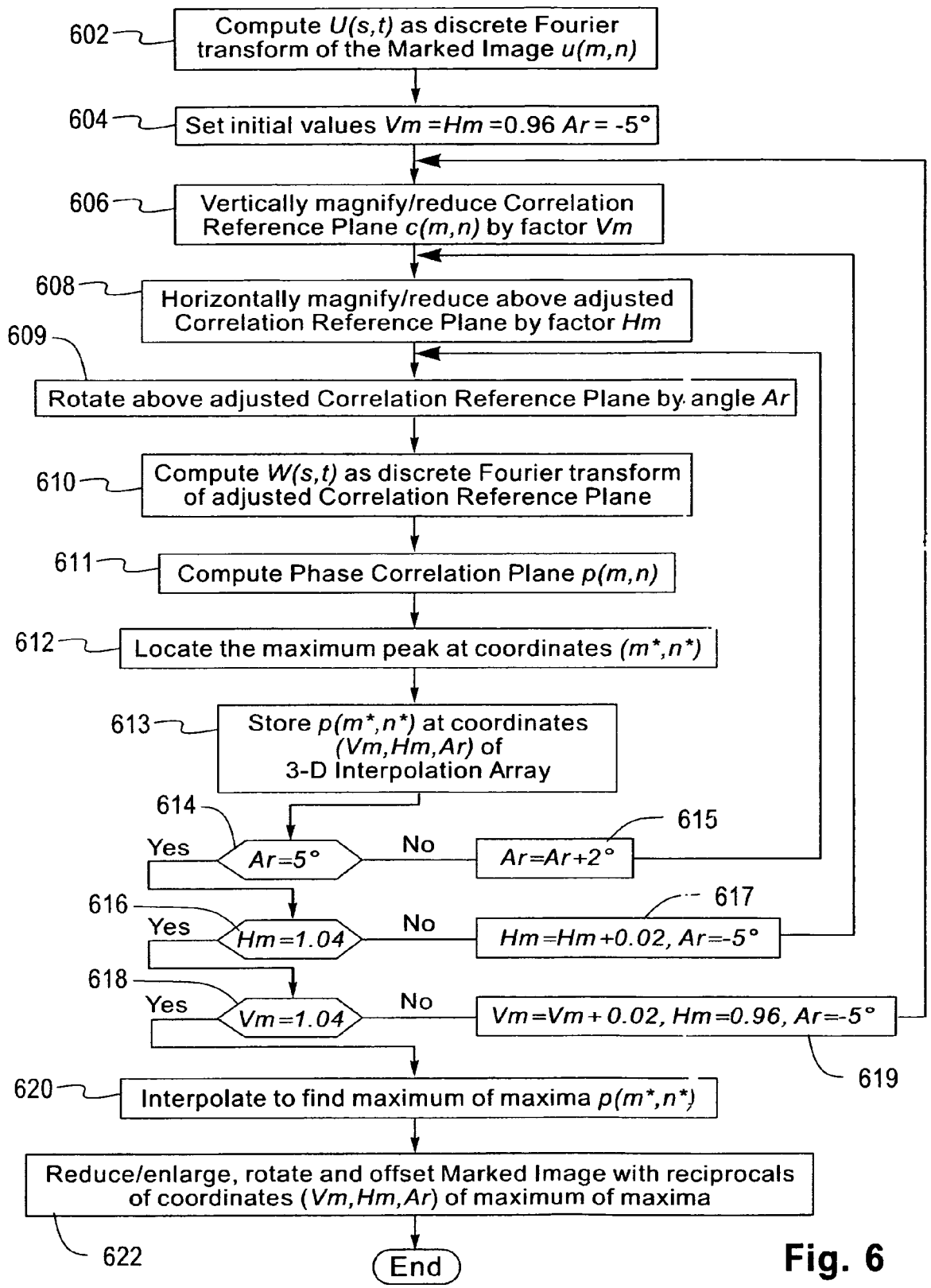
FIG. 6 shows the steps for a fine alignment of a marked image with a correlation reference plane.

A flow diagram of this embodiment is shown in FIG. 6. Those skilled in the art know there are many satisfactory algorithms available to magnify/reduce and rotate digitized images. Any one of those algorithms can be used for manipulation of the correlation reference plane in the following description. As described above, the discrete Fourier transform of the marked image U(s,t) is formed, 602, Initial values are set for stepping variables vertical magnification, vm=0.96, horizontal magnification, Hm=0.96, and angular rotation, Ar=−5a, 604. The correlation reference plane is vertically magnified/reduced according to Vm, 606. The so adjusted plane is then horizontally magnified/reduced according to Hm, 608. The so adjusted plane is then angularly rotated according to Ar, 609. The discrete Fourier transform of the so adjusted plane W(s,t) is formed, 610. The phase-correlation plane p(m,n) is calculated using the relationship of equation (16), 611. The p(m,n) plane is examined to find the coordinates (m*,n*) of its maximum value, 612. The coordinates (m*,n*) and p(m*,n*) are stored in the three-dimensional array being formed. The three-dimensional array is indexed by Vm, Hm and Ar, 613. The value of Ar is examined, 614. If it is less than plus five degrees, it is incremented by plus two degrees, 615, and steps 609-614 are repeated until Ar is found to be plus five degrees in step 614. When Ar is found to be plus five degrees in step 614, the value of Hm is examined, 616. If Hm is less than 1.04, it is incremented by 0.02 and Ar is reinitialized to minus five degrees, 617. Steps 608 to 616 are repeated until Hm is found to be 1.04 in step 616. When Hm is found to be 1.04, Vm is examined, 618. If Vm is found to be less than 1.04, it is incremented by 0.02, and Ar is initialized to minus five degrees, and Ham is initialized to 0.96, 619. Steps 606 to 618 are repeated until Vm is found to have a value of 1.04 in step 618. When Vm is found to be equal to 1.04, the values of the three-dimensional array are interpolated to find the maximum of the maxima peaks, 620. The resulting coordinates of the maximum of maxima peaks provide the final values for the vertical multiplier, the horizontal multiplier and the rotational angle for best alignment of the manipulated marked image with the correlation reference plane. The corresponding resulting values of m* and n* of the maximum of maxima provide the offset displacements of the manipulated marked image relative to the correlation reference plane. The manipulated marked image is then rescaled by the reciprocal of the found vertical and horizontal multipliers. It is rotated by the reciprocal (negative) of the found angular rotation, and is offset by the negatives of m* and n*, 622. This completes the fine setting process of reorienting and resizing.

It will be apparent to those skilled in the art that either the correlation reference plane or the manipulated marked image can be resized and reoriented to bring one into alignment with the other. The preferred embodiment resizes and reorients the manipulated marked image to bring it into alignment with the correlation reference plane, and hence into element-to-element alignment with the watermarking plane.

Detecting the Watermark in a Marked Image

The process of watermark detection is designed to produce a visibly recognizable small image as its end product. The recognizable end product is obtained in a procedure which depends upon the existence and knowledge of the watermark based on the secure random sequence. The process exploits the extremely sophisticated and not yet completely understood pattern recognition capabilities of the human visual system. It is through this exploitation that defeating the imparted watermark becomes much more difficult. A small rectangular array, called a selector, is conceived to implement the detection process. The selector array size roust be much smaller than the pixel array of the marked image to which it is being applied. This is to allow overlaying the selector on the image hundreds of times without overlapping. The selector array should be made large enough that a pixel array having the same dimensions could contain a recognizable binary image. More complex embodiments use a color rather than binary image as a reference. A selector having 32 rows and 128 columns is used in an embodiment described herein. It is applied to a marked image that has more than one million pixels.

The selector is used to locate rectangular clusters of pixels in the marked image and corresponding clusters of elements in the reconstituted watermarking plane. The clusters are randomly scattered non-overlapping positions. Random scattering of the clusters is done to further frustrate attempts to defeat watermark protection. Each element of the selector contains one or more devices associated with variables that serve to store partial results of the watermark detection scheme. One embodiment uses two selector devices, one called a "coincidence counter" and the other a "non-coincidence counter."

A variable is defined which statistically relates an attribute of an element being considered to the attributes of its neighboring elements. For each pixel in the marked image a first variable is computed for that pixel and a second variable is computed for that pixel's corresponding element in the reconstituted watermarking plane. A positive test results when the computed first variable has the same result, or a nearly or statistically deemed equivalent result, as the computed second variable. If the results are deemed to be different, the test result is deemed to be negative. The first variable is recomputed and compared with the second variable for each of that pixel's color planes. The coincidence counter associated with that selector element is incremented by unity for each color plane producing a positive result and the non-coincidence counter is incremented by unity for each color plane that produces a negative result. The purpose of each element's coincidence and non-coincidence counters is to associate with that element a confidence level of the watermark's identification with the random sequence known only to the marker and/or the marking entity.

For a tristimulus color image and for each cluster of pixels, the range of each coincidence counter value is from zero to plus three. A zero is obtained if the test results were negative for all three color planes. A plus three is obtained if the test results were positive for all three planes. The range of each non-coincidence counter is also from zero to plus three, but conversely, a zero is obtained if the test results for all three planes were positive and a plus three is obtained if the test results of all three planes were negative. The count in each coincidence counter is the accumulated sum of the counts of positive results for corresponding pixels at each cluster location, and the count in each non-coincidence counter is the accumulated sum of the counts of negative results for corresponding pixels at each cluster location. A coincidence counter value larger than the value of its corresponding non-coincidence counter is associated with a partial watermark detection. A composite of coincidence counter values greater than their corresponding non-coincidence counter values for a preponderance of the selector's elements results from and corresponds with a detected watermark.

In an embodiment the test results and/or the comparison are performed by subtraction operations. In a particular embodiment the attribute used is the pixel's brightness values. The statistical relationship is in regard to the average brightness value of the neighboring pixels. In this case, watermark detection proceeds with the steps shown in FIG. 7. A selector array size is selected, 702. In this example, the selector array size is 32 by 128 elements. All the coincidence and non-coincidence counters are initialized by setting them to read zero, 704. A specified particular element of the selector is placed on an initial position of the expanded watermarking plane, 706. The particular first element is often the selector element that is at its upper leftmost corner. This particular element also locates a corresponding pixel and its components in all the color planes of the marked image when the marked image is aligned with the expanded watermarking plane.

The following portion of the detection schema is repeated iteratively for all selector elements, for all color planes of each pixel, and for all selected clusters. The next two eight-bit integers are chosen from the regenerated secure random sequence, 708. When the schema is started for the first selector element, the next two eight-bit integers chosen in this step 708 are actually the first two eight-bit integers of the secure random sequence. The two eight-bit integers are scaled to form random horizontal and vertical offsets from the initial or previous selector location, and the selector is moved to that positions 710. The selector element sequence is reset to the coordinates of the initial particular selector element, 711. This selector element is used to locate the corresponding particular element in the watermarking plane, 712. The average magnitude of its neighboring elements in the watermarking plane is computed, 713. In the example, this is the average of the magnitudes of the particular element's neighbors that lie in an 11 by 11 square of elements with the particular element at the center of the square. If the selector element is too near an edge of the watermarking plane to be at the center of its neighborhood, the square neighborhood is moved to encompass the particular element's nearest 120 existing neighbors.

The next color plane is chosen, 714. In the beginning of this iterative schema this next color plane is actually the first color plane. In the case of a monochromatic image this is the only color plane. The coordinates of the particular selector element are used to locate a corresponding pixel color element in this next color plane, 715. The average brightness of the neighboring 120 pixel color elements is computed, 716, in a manner identical to that stated above for watermarking plane elements. The values of the particular watermarking plane element and the corresponding pixel color element are compared to their respective neighborhood averages. If both values are equal to or greater than their respective neighborhood averages, 717, or if both values are less than their respective neighborhood averages, 718, the coincidence counter of that particular selector element is incremented, 719a. If one value is less than its respective neighborhood averages and the other value is equal to or greater than its respective neighborhood averages, the non-coincidence counter of that particular selector element is incremented, 719b. The magnitude of the value in each coincidence counter relative to the magnitude of the value in its corresponding non-coincidence counter is associated with the probability of watermark sequence validation.

A determination is made if all color planes were chosen for testing their corresponding brightness value with regard to its neighboring average, 720. If not, the process returns to step 714 for choosing the next color plane. Steps 715 to 720 are repeated for this color plane. This is continued until step 720 indicates the all color planes are tested. When the last (or only) color-plane is tested, a determination is made if every element for that selector was chosen, 724. If not, the next selector element is chosen, 726. Generally, the next element is the next right-wise adjacent element on that row. If there is no next adjacent element on that row, the next element is the left-most element in the next selector row. This next selector element becomes the new particular element. Steps 712-724 are repeated until all selector elements are chosen and tested. When it is determined in step 724 that all elements have been chosen, a determination is made if all none overlapping selector locations have been chosen, 728. If not, steps 708 through 728 are repeated for all selector elements and marked image color planes. When it is determined in step 728 that all selector locations are tested, all coincidence counters have their test result values.

Figure 7A:
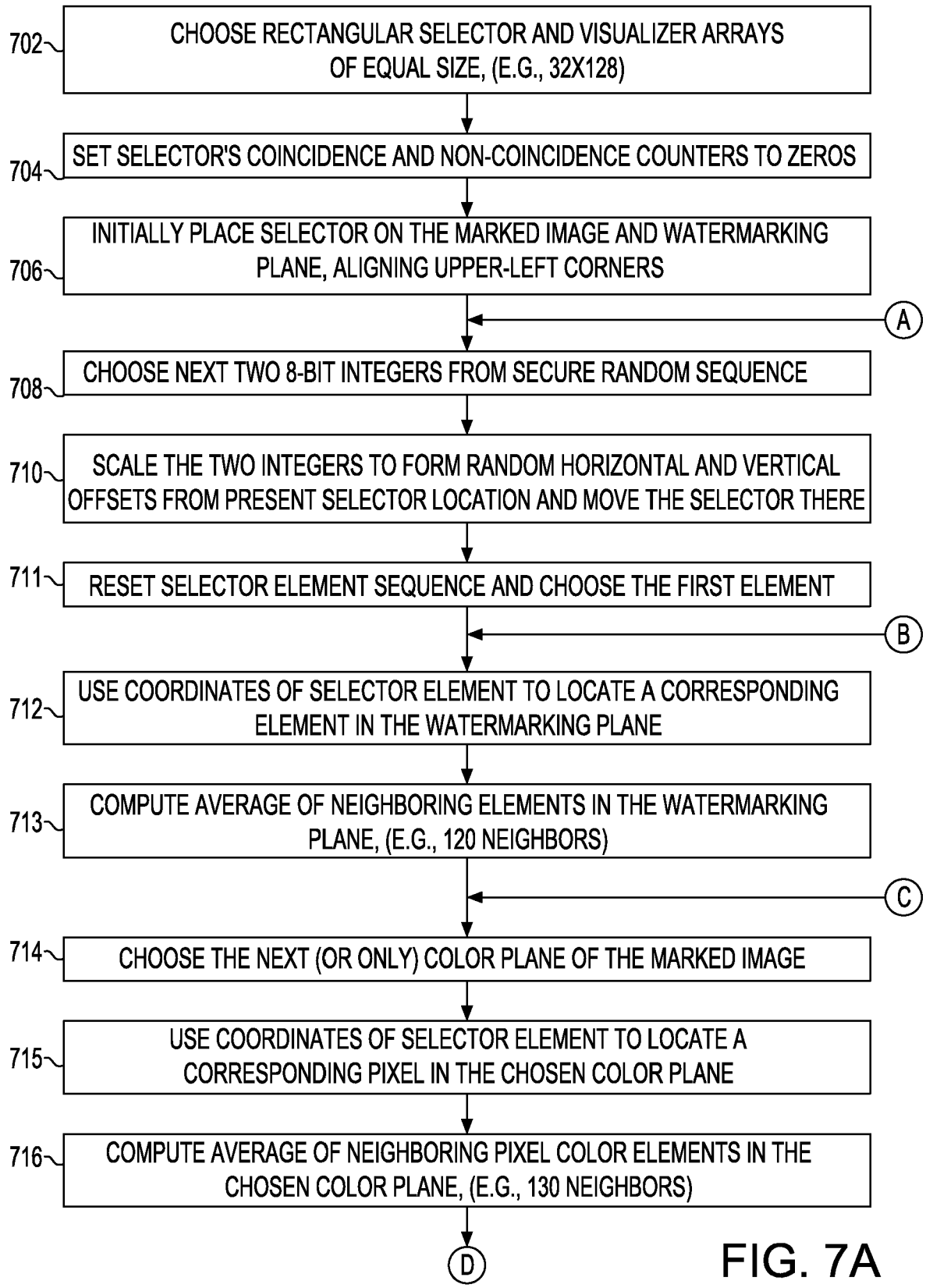
FIG. 7 shows the steps for finding a watermark in a marked image.
Figure 7B:
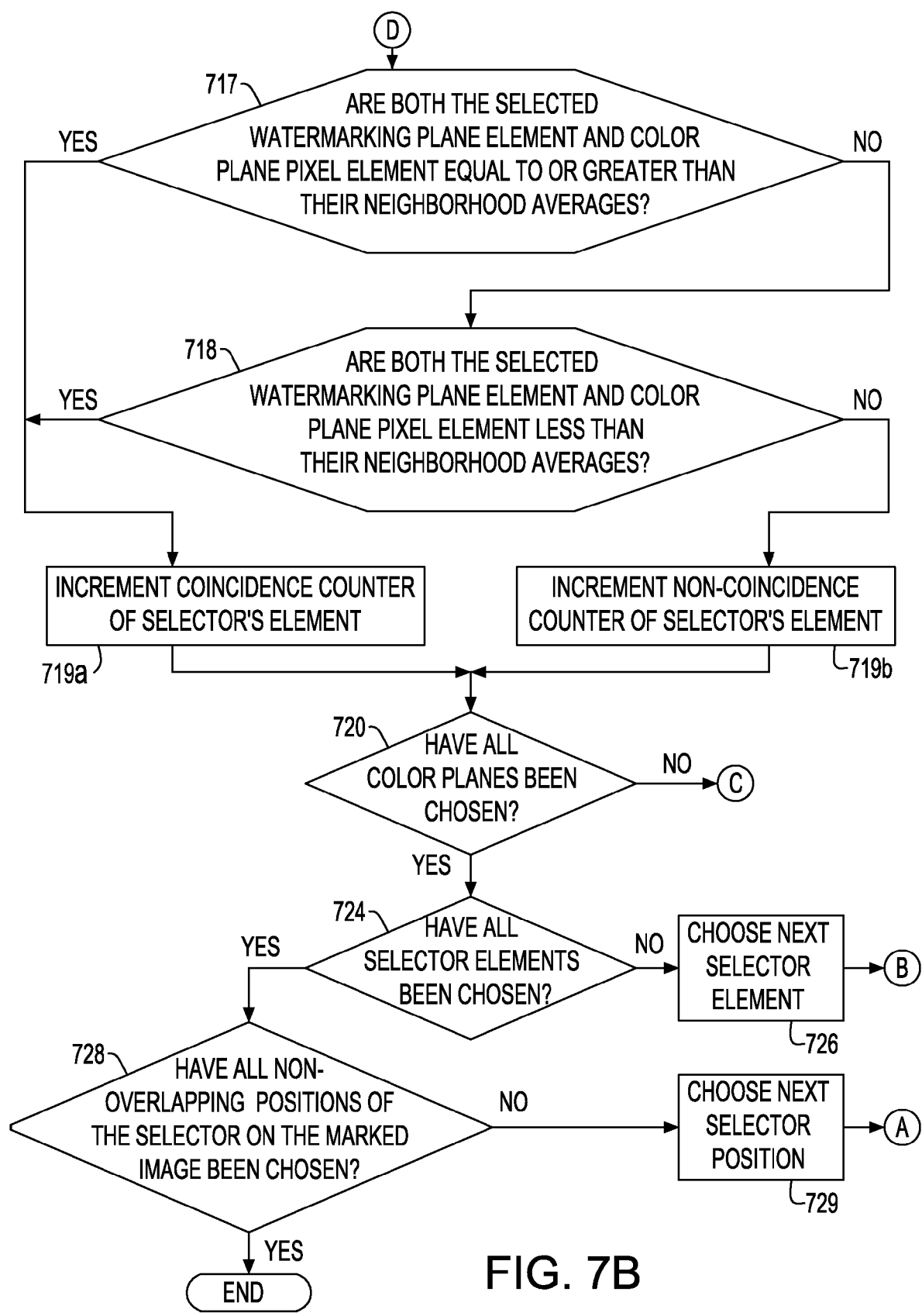

FIG. 8 shows a random multiple totality of positions of the selector 810 in a selector plane 802 resulting from an implementation of the process of FIG. 7. FIG. 8 shows a watermarking plane 804 and three color planes 806-808 of the marked image. The first selector element acted upon is often the top leftmost element 812 of the selector in each of the selector positions. It is noted that although each selector position is randomly offset from previously chosen positions, the positions do not overlap each other.

The values contained within each coincidence and non coincidence counter associates with their corresponding selector's element a confidence level of the watermark's identification with the random sequence known only to the marker and/or the marking entity. The watermark is considered to be detected if a preponderance of the differences of coincidence counter values less their respective non-coincidence counter values are nonnegative. Thus, an examination of the totality of these nonnegative differences explicitly suffices for declaring the watermark detected or not detected. Indeed, this can be considered as the end of the watermark detection technique.

Figure 9:
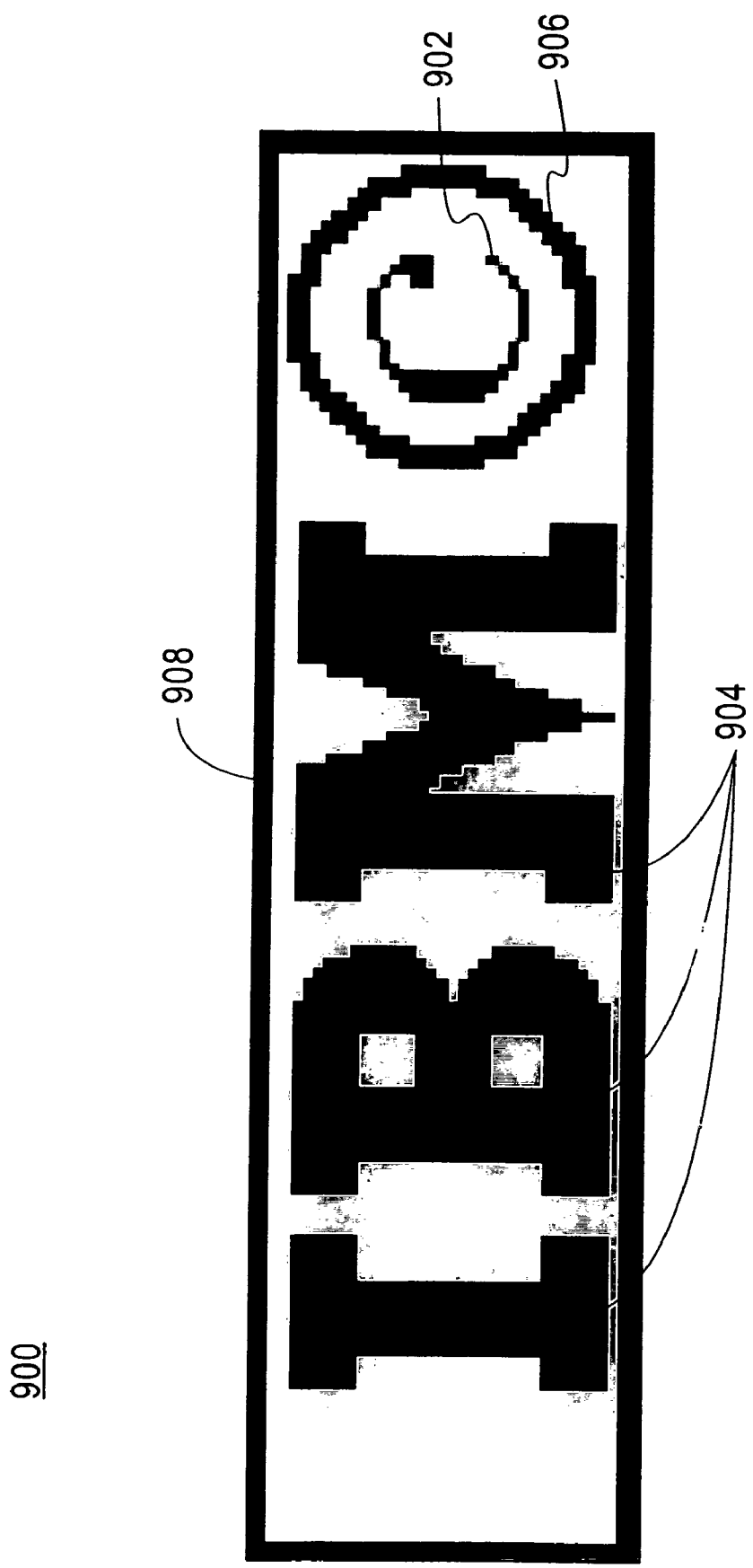
FIG. 9 shows a typical visualizer pattern.

However, it is recognized that a "preponderance" of differences being nonnegative is an inexact measure, at best. Clearly, if only a simple majority of the differences are non-negative, whether the watermark is detected or not is at best a judgment call. Most likely it would be conceded as not having been a detection. To assist in this judgment, the present invention exploits the ability of the human visual system to recognize a pattern in a cluttered field. This is accomplished by forming a binary image called a visualizer. The visualizer is formed to have the same dimensions as the selector (e.g., 32×128 pixels). A clearly recognizable pattern is placed into the visualizer. A typical visualizer pattern is shown in FIG. 9, 900. The black border surrounding the visualizer is not considered to be part of the visualizer pattern. The pattern is an arrangement of blocks of black and white pixels forming an easily recognizable pattern. A typical pixel, 902, is at the lower ending of the image of a C. The visualizer image is entirely white except for pixels making the letters IBM, 904, the copyright logo, 906, and the visualizer frame, 908.

Figure 10:
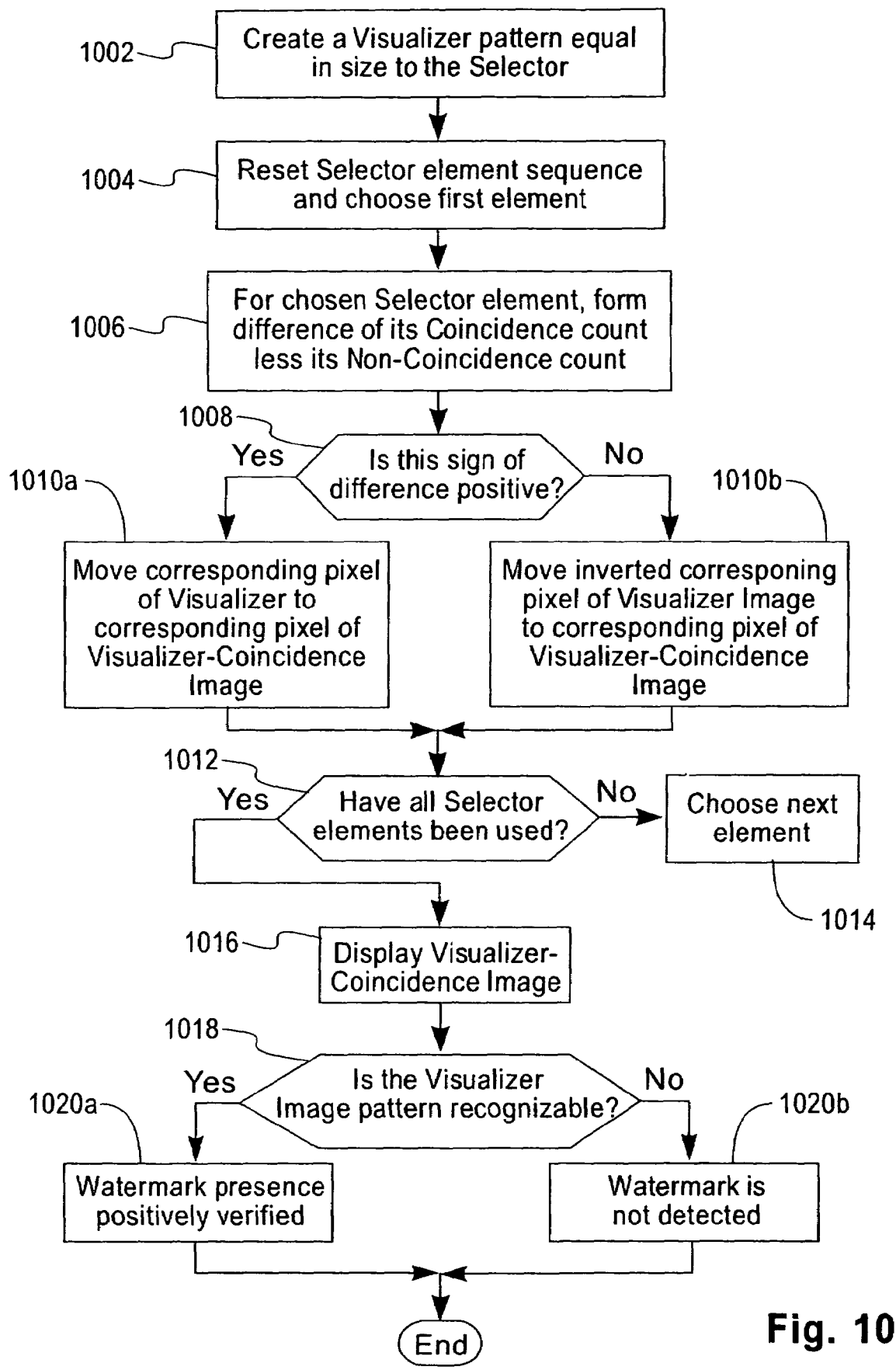
FIG. 10 shows a method of verification of the presence of the watermark.

The visualizer pattern is used to provide a visual image of the actual degree of "preponderance" of coincidence counters being nonnegative. The method steps diagramed in FIG. 10 are used to provide a watermark signature in relation to the visualizer pattern. The watermark signature is derived by using the visualizer pattern in combination with the coincidence counter difference data to form what is herein referred to as the 'visualizer-coincidence image'.

In one embodiment, the visualizer-coincidence image is formed with the steps shown in FIG. 10. A visualizer pattern is formed having a pixel array equal in size to the element array of the selector, 1002. The visualizer array consists of white and black pixels, where white is given the value one and black the value zero. All elements of the selector array will be examined to determine the pixel content of the visualizer-coincidence image. To do this, the selector element sequence is reset and the first element of the sequence is chosen, 1004. For the chosen selector element, the count in its corresponding non-coincidence counter is subtracted from the count in its corresponding coincidence counter, forming a difference, 1006. The sign of the difference is tested, 1008, and if it is negative the corresponding pixel of the visualizer is inverted (white is changed to black, and black to white) and placed into the corresponding pixel of the visualizer-coincidence image, 1010b. If the sign is positive, the corresponding pixel of the visualizer is placed unmodified into the corresponding pixel of the visualizer-coincidence image, 1010a. The selector element sequence is tested to see if all elements have been chosen, 1012, and if not, the next element is chosen, 1014 and steps 1006 to 1012 are repeated. If all selector elements have been chosen, the visualizer-coincidence image is displayed, 1016. A judgement is made as to whether the pattern in the visualizer-coincidence image is recognized as a reproduction of the visualizer pattern 1018. If it is recognized, the watermark is positively detected, 1020a. If not, the watermark is not detected, 2020b.

It is evident to those skilled in the art that if only the sign of the difference between the count in a coincidence counter less the count in its corresponding non-coincidence is to be used in constructing the visualizer-coincidence image, then only one counter would have been needed for each selector element. In that case, step 719a of FIG. 7 would read "Increment the counter of Selector's Element," and step 719b would read "Decrement the counter of Selector's Element."

Figure 11:
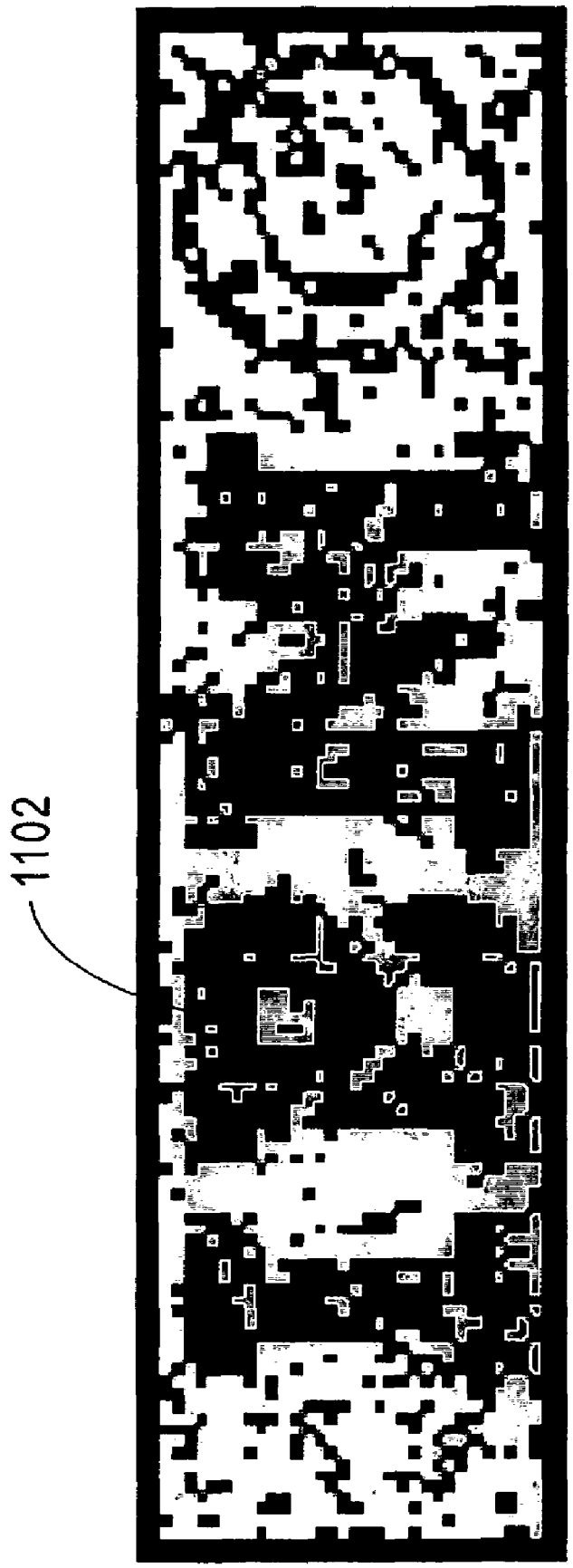
FIG. 11 shows a detection resulting from the visualizer of FIG. 9 for a watermarking made at a modulation strength of 1%.
Figure 12:
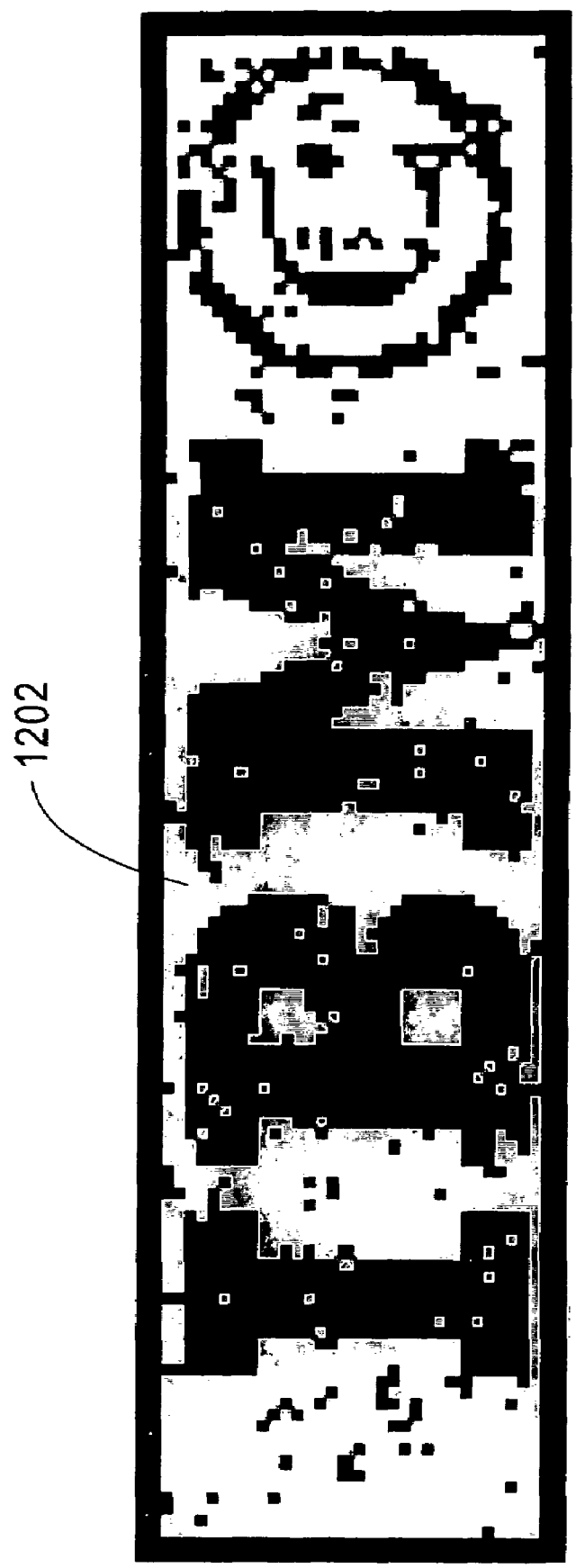
FIG. 12 shows a detection resulting from the visualizer of FIG. 9 for a watermarking made at a modulation strength of 2%.
Figure 13:
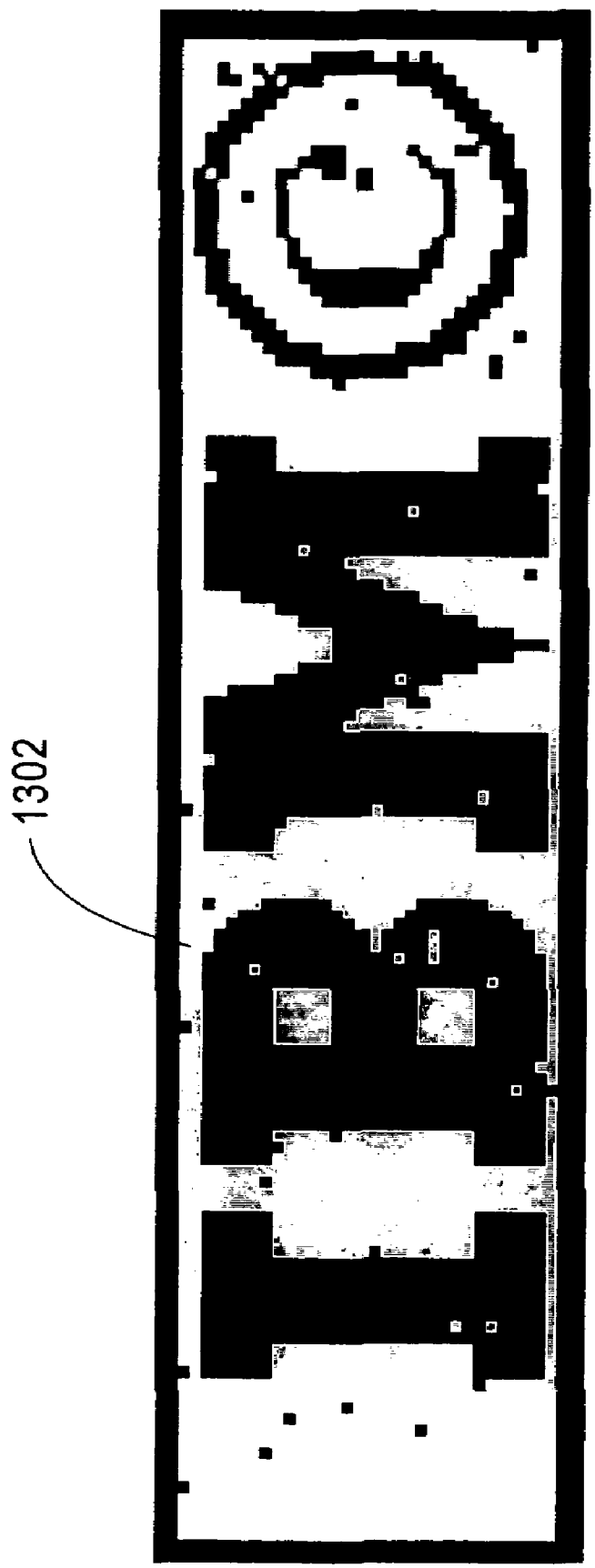
FIG. 13 shows a detection resulting from the visualizer of FIG. 9 for a watermarking made at a modulation strength of 4%.

FIG. 11 shows a detection, 1102, resulting from the visualizer of FIG. 8 for an imparted watermark made at a modulation strength of 1%. As previously stated in all cases the black border is not part of the visualizer-coincidence image. A stronger replication of the visualizer, 1202, resulting for an imparted watermark made at a modulation strength of 2% is shown in FIG. 12. A still stronger replication of the visualizer, 1302, resulting for an imparted watermark made at a modulation strength of 4% is shown in FIG. 13.

Figure 14:
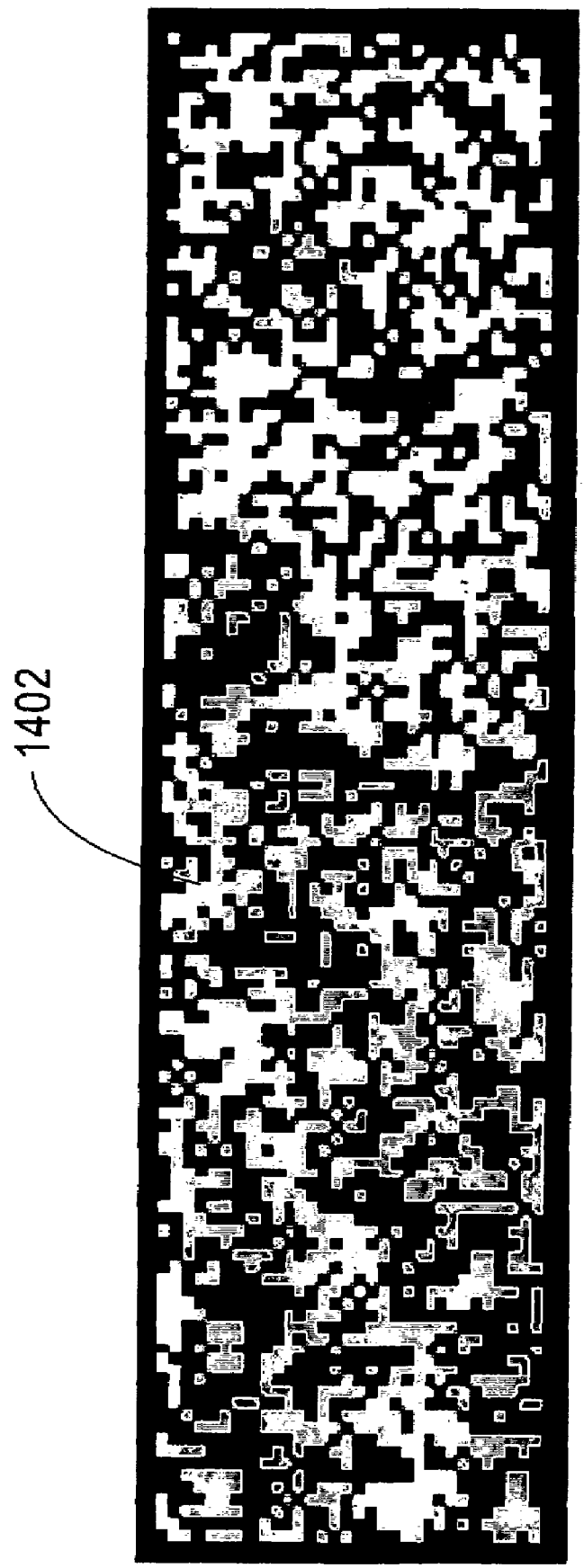
FIG. 14 shows a detection resulting when the image has no watermark.

An attempt to detect a watermark in an image that does not have one, or in an image for which the watermarking plane cannot be reconstituted, produces a visualizer pattern that is an unrecognizable random melee. FIG. 14 shows a typical visualizer-coincidence image, 1402, when a watermark is not detected. This results when many visualizer elements are subjected to inversion. A preponderance of elements not requiring inversion indicates watermark detection. This method in fact has an extremely low probability of false-positive detection. Even in a highly textured marked image, the visualizer pattern should be clearly recognizable to signify a watermark detection of very high credibility.

Clearly, more information is present in the coincidence and non-coincidence counter values than has been exploited above, where only the algebraic sign of their difference has been used. An alternative method of converting the visualizer image into a visualizer-coincidence image uses the magnitude of each coincidence counter value and that of its corresponding non-coincidence counter. If $C(i',j')$ is the value of the coincidence counter associated with selector element $i',j'$ and $C'(i,j')$ is the value of the corresponding non-coincidence counter, then the normalized magnitude of their difference $e(i',j')$ is:

$$e(i', j') = \frac{C(i', j')}{c(i', j') + C'(i', j')} \quad (17)$$

when $$C(i',j')+C'(i',j')>0, \quad (18)$$

and $$e(i',j')=\frac{1}{2}, \quad (19)$$

for $$C(i',j')+C'(i',j')=0, \quad (20)$$

In this case, the visualizer image is converted into a visualizer-coincidence image by replacing each pixel in the visualizer image with the corresponding value of $e(i',j')$, when the visualizer pixel value is one; and by $1-e(i',j')$, when the visualizer pixel value is zero. Notice that the visualizer-coincidence image is no longer a binary image, but includes gray shades ranging from black to white. The judgement as to whether the pattern placed in the visualizer is recognizable in the visualizer-coincidence image is the same as before, and an attempt to detect the presence of a known watermark in an image not having one, or in an image having one but for which the watermarking plane cannot be precisely reconstituted, also still produces an unrecognizable random melee in the visualizer-coincidence image.

Thus, this scheme makes more use of the actual values in the coincidence and non-coincidence counters. It still employs a black and white element visualizer image pattern wherein each element is either black or white (zero or one). However, the resulting elements of the visualizer-coincidence image have values ranging between zero and one such that when displayed it has various levels of shades of gray. The gray level depends on the counter data.

Figure 15:
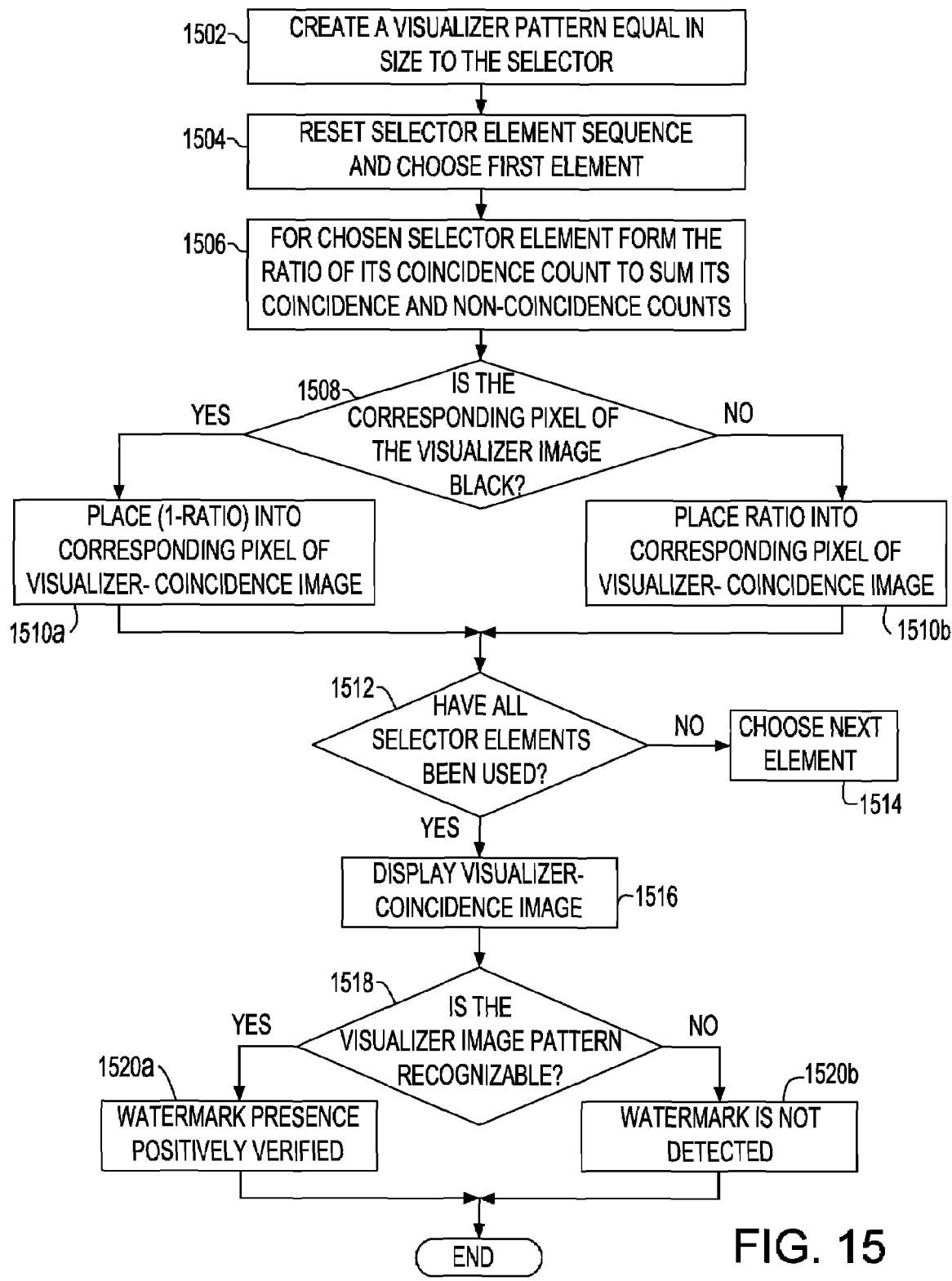
FIG. 15 shows the steps for an alternate method of finding a watermark in a marked image.
Figure 16:
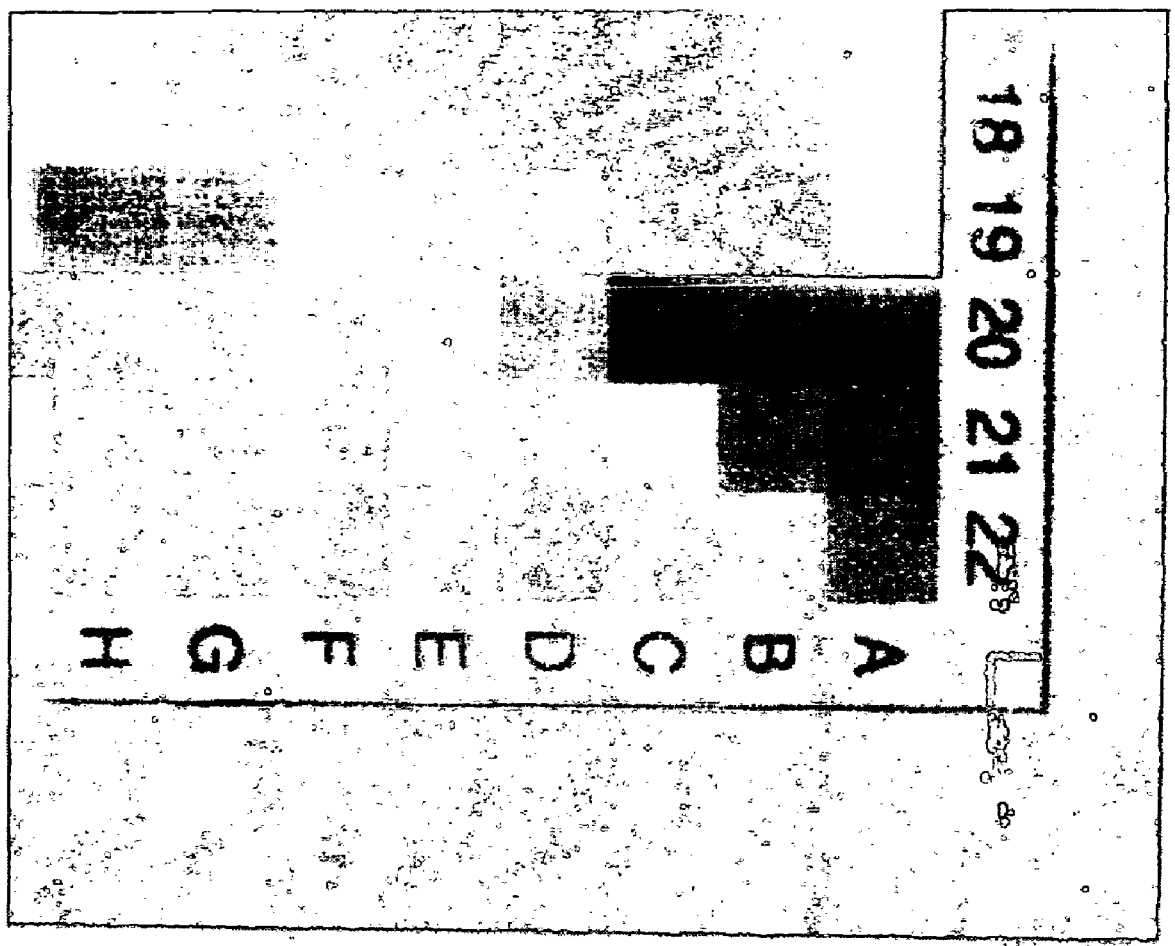
Figure 17:
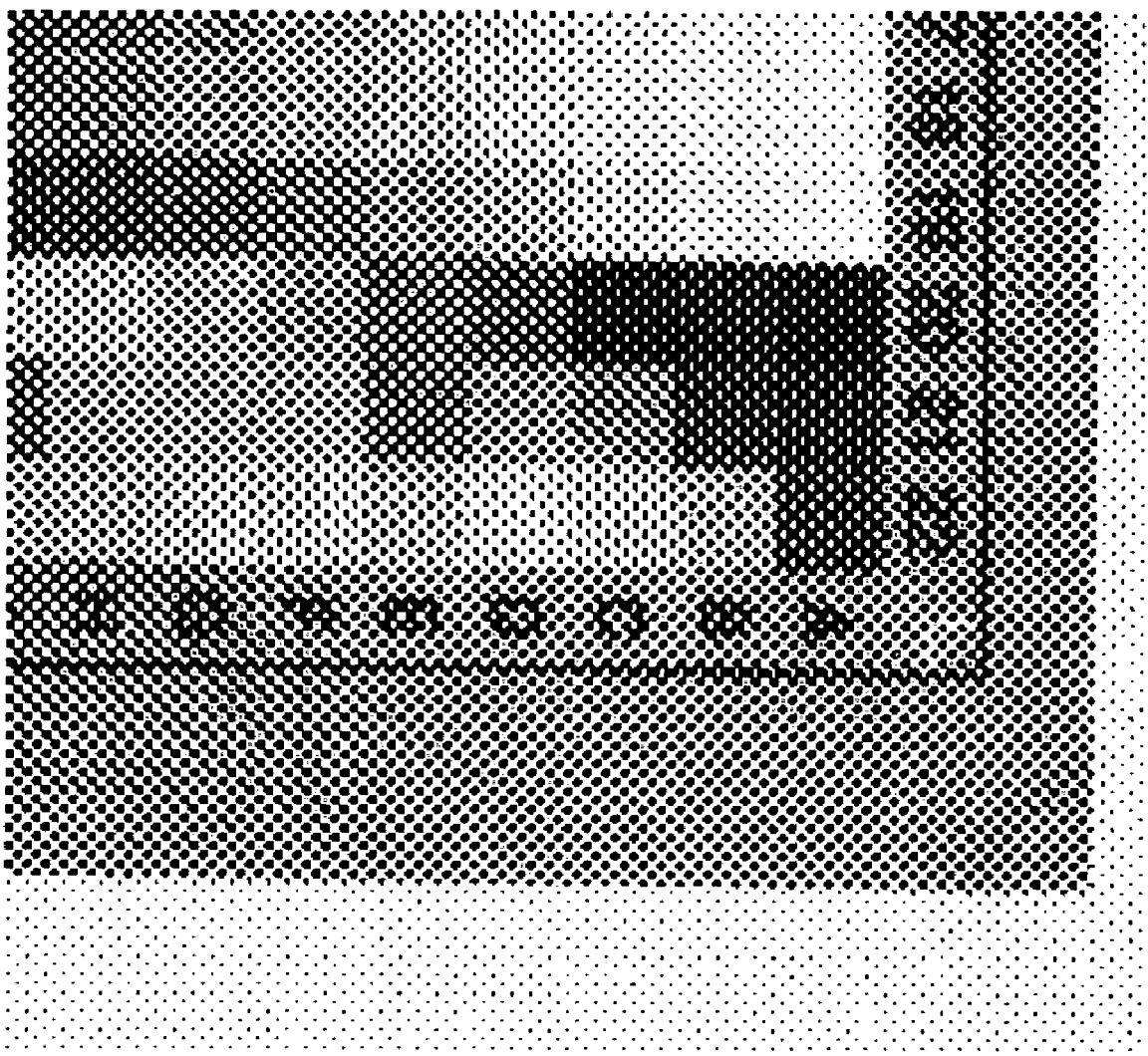
Figure 18:
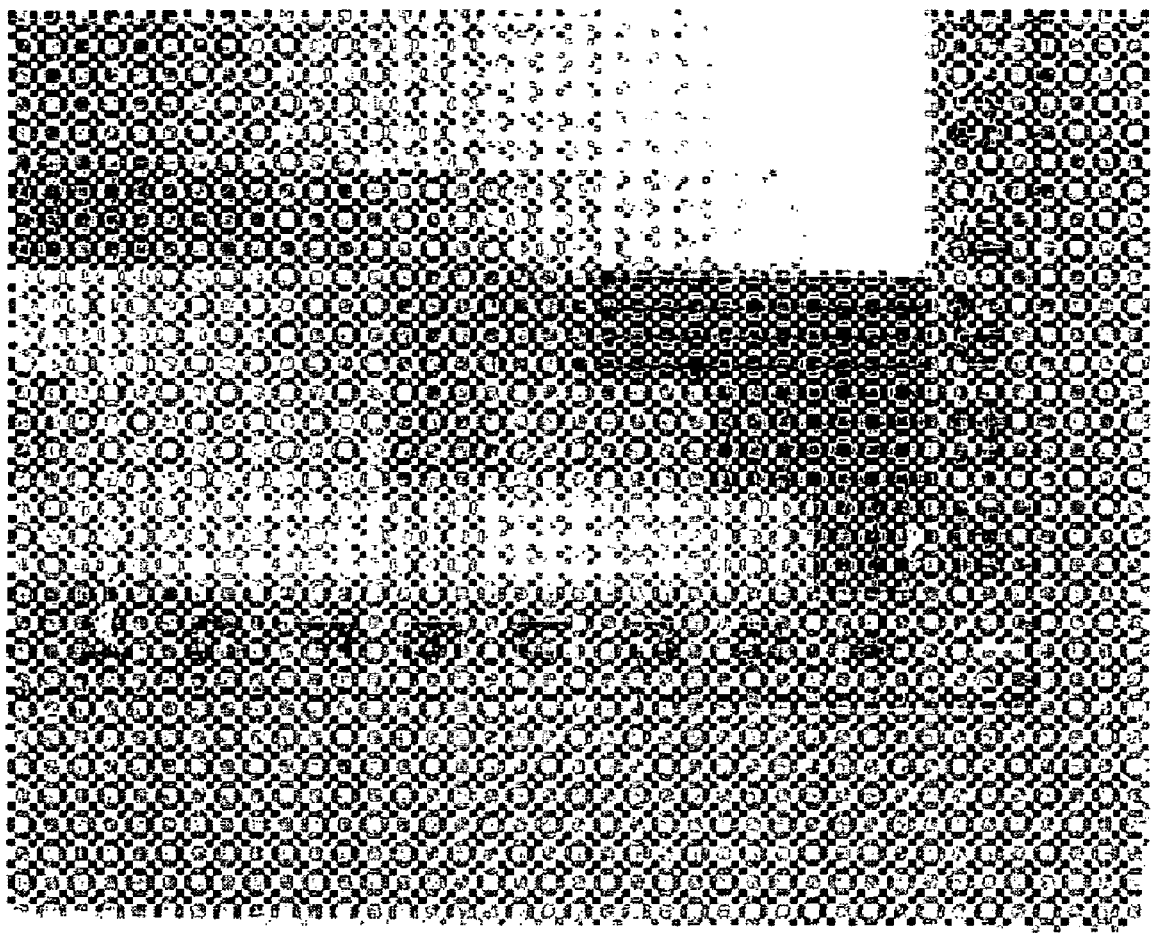
Figure 19:
Figure 20:
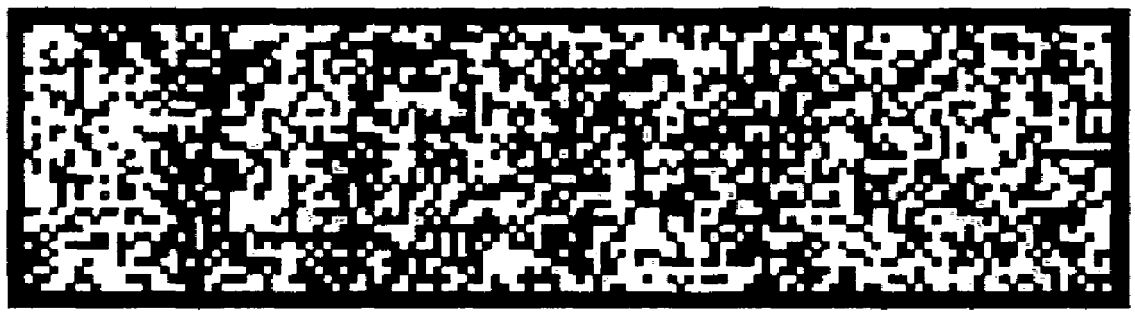
Figure 21:
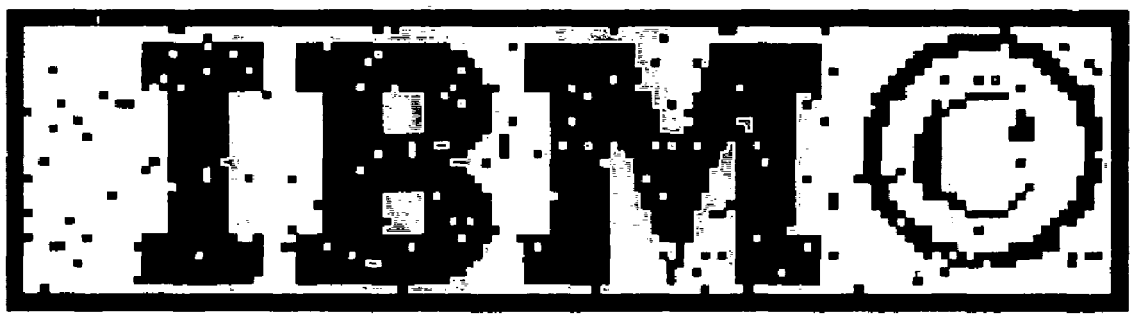

An embodiment of this alternative scheme is shown in FIG. 15. A visualizer pattern is formed having a pixel array equal in size to the element array of the selector, 1502. The visualizer array consists of white and black pixels, where white is given the value one and black the value zero. All elements of the selector array will be examined to determine the pixel content of the visualizer-coincidence image. To do this, the selector element sequence is reset and the first element of the sequence is chosen, 1504. For the chosen selector element, the ratio of the count in its corresponding coincidence counter to the sum of the counts in its corresponding coincidence and non-coincidence counters is computed, 1506. The color of the corresponding visualizer pixel is tested, 1508, and if it is black, the ratio subtracted from one is placed into the corresponding pixel of the visualizer-coincidence image, 1510a. If the visualizer pixel is white, the ratio is placed unmodified into the corresponding pixel of the visualizer-coincidence image, 1510b. The selector element sequence is tested to see if all elements have been chosen, 1512, and if not, the next element is chosen, 1514, and steps 1506 to 1512 are repeated. If all selector elements have been chosen, the visualizer-coincidence image is displayed as a high contrast monochrome image, 1516. A judgement is made as to whether the pattern in the visualizer-coincidence image is recognized as a reproduction of the visualizer pattern, 1518. If it is recognized, the watermark is positively detected, 1520a. If not, the watermark is not detected, 1520b.

Although the description is made for particular embodiments, techniques and arrangements, the intent and concept of the present invention are suitable to other embodiments, techniques and arrangements. For example, an obvious choice, and the choice of last resort, in demonstrating the existence of a watermark in a manipulated marked image is to again impart the watermark onto a copy of the unmarked original digitized image, and to use the color planes of that reconstituted marked image as ideal substitutes for the watermarking plane. The disadvantage of this alternative method is that it requires access to a copy of the unmarked original image. The visualizer can also have multiple color planes. The visualizer can be employed without the selector by having at least one statistical value associated with each pixel of the visualizer. Also, sequential repositioning of the selector on the reconstituted watermarking plane need not be non-overlapping. Non-overlapping selector positions in the presented embodiment represent only a computational simplification. Also, a small random but coherent image may be included in the watermarking plane at positions known only to the marker and/or marking entity; if the so constituted watermarking plane were imparted onto a uniform color plane with strong modulation strength, the coherent image would be visible without use of a visualizer. Other methods of watermark detection and/or demonstration may be employed. These may for instance utilize any of the many statistical relationships between elements and their neighbors or non-neighbors. The robust techniques presented here may be used in combination with visible watermarking techniques as well as fragile invisible techniques. It will be clear to those skilled in the art that other modifications to the disclosed embodiments can be effected without departing from the spirit and scope of the invention.

What is claimed is:

1. A watermarking method comprising imparting an invisible watermark onto an original digitized image, the step of imparting comprising the steps of:
   providing said original digitized image comprised of a plurality of pixels, wherein each pixel of said pixels includes brightness data that represents a brightness of at least one color; and
   multiplying said brightness data associated with at least one of said pixels by a predetermined brightness multiplying factor in the range of 0.8 to 1.1, there being one multiplying factor for each pixel of said plurality of pixels, said one multiplying factor modifying only the brightness of said each pixel of said pixels.

2. A method as recited in claim 1, wherein each pixel is associated with a brightness data value that represents a brightness of a monochrome color.

3. A method as recited in claim 1, wherein each pixel is associated with a plurality of brightness data values.

4. A method as recited in claim 3, wherein said plurality of brightness data values represents brightness of a red, green and blue color.

5. A method as recited in claim 1, wherein said watermark has an invisibility classification level of undetectably invisible.

6. A method as recited in claim 1, wherein said brightness multiplying factor has a relationship with a number taken from a number sequence generator.

7. A method as recited in claim 6, wherein said number sequence generator is a pseudo-random sequence generator.

8. A method as recited in claim 6, wherein each of said pixels has a row and a column location in an array representing said digitized image, and wherein said brightness multiplying factor employs a different sequential combination of numbers from said number sequence generator in sequential correspondence to said row and column location.

9. A method as recited in claim 6, wherein said number sequence generator is generated employing a National Standard Data Encryption Algorithm.

10. A method as recited in claim 6, wherein said sequence is formed from a plurality of watermarking parameters.

11. A method as recited in claim 10, wherein said parameters comprise a cryptographic key, two coefficients and an initial value of said number sequence generator.

12. A watermark removable method having a predetermined brightness multiplying factor in the range of 0.8 to 1.0, and further comprising removing a watermark from a watermarked digitized image, said watermarked digitized image being spatially aligned with a copy of the original digitized image, not being geometrically distorted, and having been previously watermarked according to the method of claim 10, the step of removing comprising:
   providing said watermarked digitized image comprised of a plurality of watermarked pixels, wherein each of said watermarked pixels includes brightness data that represents a brightness of at least one color;
   recalling the plurality of watermarking parameters and the predetermined brightness multiplying factor for each pixel of said plurality of watermarked pixels used in creating the watermarked digitized image from the original image; and
   dividing said brightness data associated with at least one of said watermarked pixels by the predetermined brightness multiplying factor.

13. An article of manufacture comprising a computer usable medium having computer readable program code means embodied therein for causing watermarking, the computer readable program code means in said article of manufacture comprising computer readable program code means for causing a computer to effect the steps of claim 12.

14. A watermark removal apparatus, comprising means for removing a watermark from a watermarked digitized image, said watermarked digitized image being spatially aligned with a copy of the original digitized image, not being geometrically distorted, and having been previously watermarked according to the method of claim 10, the means for removing comprising:
   means for providing said watermarked digitized image comprised of a plurality of watermarked pixels, wherein each of said watermarked pixels includes brightness data that represents a brightness of at least one color;
   means for recalling the plurality of watermarking parameters and the predetermined brightness multiplying factor for each pixel of said plurality of watermarked pixels used in creating the watermarked digitized image from the original image; and
   means for dividing said brightness data associated with at least one of said watermarked pixels by the predetermined brightness multiplying factor.

15. A computer program product comprising a computer usable medium having computer readable program code means embodied therein for causing watermark removal, the computer readable program code means in said computer program product comprising computer readable program code means for causing a computer to effect the functions of claim 14.

16. A method as recited in claim 1, wherein said brightness multiplying factor has a modulation strength of less than 0.5 percent.

17. An article of manufacture comprising a computer usable medium having computer readable program code means embodied therein for causing a watermark, the computer readable program code means in said article of manufacture comprising computer readable program code means for causing a computer to effect the steps of claim 1.

18. A program storage device readable by machine, tangibly embodying a program of instructions executable by the machine to perform method steps for watermarking, said method steps comprising the steps of claim 1.

19. A watermarking apparatus comprising means for imparting an invisible watermark onto an original digitized image, the means for imparting comprising:
- means for providing said original digitized image comprised of a plurality of pixels, wherein each pixel of said pixels includes brightness data that represents a brightness of at least one color; and
- means for multiplying said brightness data associated with at least one of said pixels by a predetermined brightness multiplying factor in the range of 0.8 to 1.1, there being one multiplying factor for each pixel of said plurality of pixels, said one multiplying factor modifying only the brightness of said each pixel of said pixels.

20. A computer program product comprising a computer usable medium having computer readable program code means embodied therein for causing the imparting of an invisible watermark onto an original digitized image, the computer readable program code means in said computer program product comprising:
- computer readable program code means for causing a computer to effect the provision of said original digitized image comprised of a plurality of pixels, wherein each pixel of said pixels includes brightness data that represents a brightness of at least one color; and
- computer readable program code means for causing a computer to effect the multiplication of said brightness data associated with at least one of said pixels by a predetermined brightness multiplying factor in the range of 0.8 to 1.1, there being one multiplying factor for each pixel of said plurality of pixels, said one multiplying factor modifying only the brightness of said each pixel of said pixels.

21. A watermarking method comprising imparting an invisible watermark onto an original digitized image, the step of imparting comprising the steps of:
- providing said original digitized image comprised of a plurality of pixels, wherein each pixel of said pixels includes brightness data that represents a brightness of at least one color; and
- multiplying said brightness data associated with at least one of said pixels by a predetermined brightness multiplying factor, said brightness multiplying factor, "mf", is selected from the group consisting of ($0.8 \leq$ "mf" $\leq 1$), wherein the value of said multiplying factor for each of said plurality of pixels is determined independent of a multiplying factor of an adjacent pixel.

22. An article of manufacture comprising a computer usable medium having computer readable program code means embodied therein for causing a watermark, the computer readable program code means in said article of manufacture comprising computer readable program code means for causing a computer to effect the steps of claim 21.

23. A watermarking apparatus comprising means for imparting an invisible watermark onto an original digitized image, the means for imparting comprising:
- means for providing said original digitized image comprised of a plurality of pixels, wherein each pixel of said pixels includes brightness data that represents a brightness of at least one color; and
- means for multiplying said brightness data associated with at least one of said pixels by a predetermined brightness multiplying factor, said brightness multiplying factor, "mf", is selected from the group consisting of ($0.8 \leq$ "mf" $\leq 1$), wherein the value of said multiplying factor for each of said plurality of pixels is determined independent of a multiplying factor of an adjacent pixel.

24. A computer program product comprising a computer usable medium having computer readable program code means embodied therein for causing the imparting of an invisible watermark onto an original digitized image, the computer readable program code means in said computer program product comprising:
- computer readable program code means for causing a computer to effect the provision of said original digitized image comprised of a plurality of pixels, wherein each pixel of said pixels includes brightness data that represents a brightness of at least one color; and
- computer readable program code means for causing a computer to effect the multiplication of said brightness data associated with at least one of said pixels by a predetermined brightness multiplying factor, said brightness multiplying factor, "mf", is selected from the group consisting of ($0.8 \leq$ "mf" $\leq 1$), wherein the value of said multiplying factor for each of said plurality of pixels is determined independent of a multiplying factor of an adjacent pixel.

25. A watermarking method comprising imparting an invisible watermark onto an original digitized image, the step of imparting comprising the steps of:
- providing said original digitized image comprised of a plurality of pixels, wherein each pixel of said pixels includes brightness data that represents a brightness of at least one color, said digitized image comprises at least one region comprising an array of pixels, each element of said array comprises an individual multiplying factor, said array is transformable by a discrete transformation to a complementary space of multiplying factor representing values, said multiplying factor representing values are modifiable in said complementary space and transformable by to an array of modified multiplying factors; and
- multiplying said brightness data associated with at least one of said pixels by a predetermined brightness multiplying factor, said brightness multiplying factor, "mf", is selected from the group consisting of ($0.8 \leq$ "mf" $\leq 1$).

26. An article of manufacture comprising a computer usable medium having computer readable program code means embodied therein for causing a watermark, the computer readable program code means in said article of manufacture comprising computer readable program code means for causing a computer to effect the steps of claim 25.

27. A watermark removal method comprising removing a watermark from a watermarked digitized image, said watermarked digitized image being spatially aligned with a copy of the original digitized image and having been previously watermarked according to a method comprising the steps of:
- providing said original digitized image comprised of a plurality of pixels, wherein each pixel in said plurality of pixels having at least one color component, each pixel of said plurality of pixels includes brightness data that represents a brightness of at least one color; and
- multiplying the brightness data associated with each pixel from said a plurality of said pixels by a predetermined brightness multiplying factor, the step of removing comprising the steps of:
- recreating for each said pixel said predetermined brightness multiplying factor used in forming the watermarked digitized image from the original digitized image; and
- dividing said brightness data associated with each of said watermarked pixels by the predetermined brightness multiplying factor associated with each of said watermarked pixels.

28. A watermark removal method as recited in claim 27, wherein the step of recreating comprising recalling a plurality of watermarking parameters.

29. An article of manufacture comprising a computer usable medium having computer readable program code means embodied therein for causing watermark removal, the computer readable program code means in said article of manufacture comprising computer readable program code means for causing a computer to effect the steps of claim 27.

30. A watermark removal apparatus comprising means for removing a watermark from a watermarked digitized image, said watermarked digitized image being spatially aligned with a copy of the original digitized image and having been previously watermarked according to a method comprising the steps of:

providing said original digitized image comprised of a plurality of pixels, wherein each pixel in said plurality of pixels having at least one color component, each pixel of said plurality of pixels includes brightness data that represents a brightness of at least one color; and multiplying the brightness data associated with each pixel from said a plurality of said pixels by a predetermined brightness multiplying factor, the means for removing comprising:

means for recreating for each said pixel said predetermined brightness multiplying factor used in forming the watermarked digitized image from the original digitized image; and means for dividing said brightness data associated with each of said watermarked pixels by the predetermined brightness multiplying factor associated with each of said watermarked pixels.

31. A computer program product comprising a computer usable medium having computer readable program code means embodied therein for causing watermark removal, the computer readable program code means in said computer program product comprising computer readable program code means for causing a computer to effect the functions of claim 30.

* * * * *